(12) United States Patent
Hessling-von Heimendahl et al.

(10) Patent No.: US 12,734,960 B2
(45) Date of Patent: Sep. 15, 2026

(54) AIRCRAFT PASSENGER READING LIGHT, AIRCRAFT COMPRISING AN AIRCRAFT PASSENGER READING LIGHT, AND METHOD OF OPERATING AN AIRCRAFT PASSENGER READING LIGHT

(71) Applicant: Goodrich Lighting Systems GmbH & Co. KG, Lippstadt (DE)

(72) Inventors: Andre Hessling-von Heimendahl, Koblenz (DE); Carsten Pawliczek, Lippstadt (DE); Anil Kumar Jha, Lippstadt (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 19/206,481

(22) Filed: May 13, 2025

(65) Prior Publication Data

US 2025/0353431 A1 Nov. 20, 2025

(30) Foreign Application Priority Data

May 14, 2024 (EP) .................................... 24175859

(51) Int. Cl.

| | |
|---|---|
| ***B60Q 3/47*** | (2017.01) |
| ***B60Q 3/44*** | (2017.01) |
| ***B60Q 3/60*** | (2017.01) |
| ***B64D 11/00*** | (2006.01) |
| ***H05B 45/10*** | (2020.01) |
| ***H05B 45/20*** | (2020.01) |
| ***H05B 47/155*** | (2020.01) |

(52) U.S. Cl.

CPC ................. *B60Q 3/47* (2017.02); *B60Q 3/44* (2017.02); *B60Q 3/60* (2017.02); *B64D 11/00* (2013.01); *H05B 45/10* (2020.01); *H05B 45/20* (2020.01); *H05B 47/155* (2020.01); *B64D 2011/0053* (2013.01)

(58) Field of Classification Search

CPC ... B60Q 3/47; B60Q 3/44; B60Q 3/60; H05B 45/20; H05B 45/10; H05B 47/155; B64D 11/00; B64D 2011/0053; B64D 2011/0038; B64D 47/02

USPC ......................................................... 362/470

See application file for complete search history.

(56) References Cited

U.S. PATENT DOCUMENTS 7,150,548 B2 12/2006 Kohlmeier-Beckmann et al.
8,439,533 B2 5/2013 Heym et al.

(Continued)

OTHER PUBLICATIONS

European Patent Office, European Search Report dated Oct. 17, 2024 in Application No. 24175859.8.

*Primary Examiner* — Laura K Tso
(74) *Attorney, Agent, or Firm* — SNELL & WILMER L.L.P.

(57) ABSTRACT

An aircraft passenger reading light comprises a plurality of pairs of light sources. Each of the plurality of pairs of light sources includes: a first light source for emitting light having a first color, and a second light source for emitting light having a second color, wherein the second color differs from the first color. The aircraft passenger reading light further comprises, for each of the plurality of pairs of light sources: a first optical system for forming a first light output from the light emitted by the first light source, and a second optical system for forming a second light output from the light emitted by the second light source.

15 Claims, 12 Drawing Sheets

(56) References Cited

U.S. PATENT DOCUMENTS

| | | | | |
|---|---|---|---|---|
| 10,967,785 | B2 * | 4/2021 | Pawliczek | B60Q 3/44 |
| 11,305,689 | B2 | 4/2022 | Jha et al. | |
| 11,318,882 | B2 | 5/2022 | Johannessen et al. | |
| 2018/0327096 | A1 | 11/2018 | Lins | |
| 2023/0348097 | A1 | 11/2023 | Hessling-Von Heimendahl et al. | |
| 2024/0117952 | A1 | 4/2024 | Jha et al. | |

* cited by examiner 2
21
27
22
23
24
25
29
41
42
43
51
52
53
61
62
63
71
72
73
81
82
83
6a
17
19

2
8b
20
8a
8b
20
8b
8a
20
8a
6b
16b
5
6a
16a
6b
16b
6a
16a
6b
16b
6a
16a
12a
12b
12c
10
14a
14b
14c 2
8b
20b
6b
16b
5
8b
20a
8a
6a
16a
20b
6b
16b
8b
20a
8a
6a
16a
20b
6b
16b
20a
6a
16a
8a
12a
12b
12c
14a
14b
14c

AIRCRAFT PASSENGER READING LIGHT, AIRCRAFT COMPRISING AN AIRCRAFT PASSENGER READING LIGHT, AND METHOD OF OPERATING AN AIRCRAFT PASSENGER READING LIGHT

CROSS-REFERENCE TO RELATED APPLICATIONS

This application claims priority to EP Patent Application No. 24175859.8, filed May 14, 2024 (DAS code 7BC5) and titled "AIRCRAFT PASSENGER READING LIGHT, AIRCRAFT COMPRISING AN AIRCRAFT PASSENGER READING LIGHT, AND METHOD OF OPERATING AN AIRCRAFT PASSENGER READING LIGHT," which is incorporated by reference herein in its entirety for all purposes.

FIELD

The present invention is in the field of aircraft passenger reading lights. The present invention is in particular related to aircraft passenger reading lights that may be employed in different types of aircraft. The present invention is further related to an aircraft comprising at least one aircraft passenger reading light, and to a method of operating an aircraft passenger reading light.

BACKGROUND

Passenger aircraft, such as commercial airplanes, usually have a passenger cabin comprising a plurality of passenger seats and passenger reading lights arranged above the passenger seats, in order to allow passengers, sitting in the passenger seats, to read even if the illumination within the passenger cabin is dimmed low or switched off.

In order to provide a convenient reading light illumination to the passengers, the aircraft passenger reading lights are commonly adapted to the geometry of the passenger cabin of the aircraft in which they are to be installed. They are in particular adapted to the spatial relation between the aircraft passenger reading light and the passenger seat which is to be illuminated.

In previous approaches, the light color, emitted by the aircraft passenger reading light, has not always been satisfactory. In particular, the light color has not always been in line with the desired illumination of the passenger reading zones.

It would therefore be beneficial to provide an aircraft passenger reading light which is capable of providing a reading light output with good adaptability/settability of the light color, while a high uniformity of the light output can be achieved across various light colors.

SUMMARY

Exemplary embodiments of the invention include an aircraft passenger reading light that comprises: a plurality of pairs of light sources, wherein each of the plurality of pairs of light sources includes a first light source for emitting light having a first color, and a second light source for emitting light having a second color, wherein the second color differs from the first color. The aircraft passenger reading light further comprises a first optical system for forming a first light output from the light emitted by the first light source; and a second optical system for forming a second light output from the light emitted by the second light source. The first light source, the second light source, the first optical system, and the second optical system are arranged and configured for directing the first light output and the second light output to a pair-specific reading zone, such that the first light output and the second light output at least partially overlap for providing a mixed-color reading light output in the pair-specific reading zone.

The pair-specific reading zone is a reading zone that is associated with the respective pair of light sources for being illuminated by f pair of light sources. The pair-specific reading zone is the common target zone for the first light source in combination with the first optical system and for the second light source in combination with a second optical system. Typically, each reading zone is associated with one of the passenger seats arranged under the respective aircraft passenger reading light.

For providing a reading light output that is perceived as pleasant by the passengers, the first light source, the second light source, the first optical system, and the second optical system may in particular be arranged and configured for maximizing the overlap between the first and second light outputs. In this way, it may be possible to reduce, in particular minimize or even eliminate, colorful boundaries at the outer periphery of the mixed-color reading light output. With the first light source and the second light source being provided with dedicated first and second optical systems, the combination of the first light source and the first optical system on the one hand and the combination of the second light source and the second optical element on the other hand can be arranged to achieve a particularly high overlap between the first and second light outputs.

With the first light source and the second light source having different colors and with the colors mixing in the pair-specific reading zone due to the overlap of the first and second light outputs, the light color, as emitted by the aircraft passenger reading light, can be adapted/set, to the extent possible by mixing two different colors. The light color of the aircraft passenger reading light may be adapted to the desired illumination properties, e.g. adapted to the particular wishes of a particular aircraft operator/of a particular airline.

As compared to previous approaches, where a plurality of light sources with different colors were used with a single optical system, the unpleasant color fringing at the periphery of the reading zone may be reduced. In particular, the effect of previous approaches that a mixed light output of the aircraft passenger reading light has colorful boundaries, caused by a parallax-shift of the light outputs of the plurality of light sources, may be reduced or even eliminated. Further in particular, such effect of colorful boundaries may be reduced to such an extent that it is not perceived as unpleasant or annoying by the passengers using the aircraft passenger reading light.

In an embodiment, for each of the plurality of pairs of light sources, the first light source, the second light source, the first optical system, and the second optical system are arranged and configured such that, at a distance of 50 cm from the aircraft passenger reading light, the maximal spatial offset between first light output and the second light output is less the 20 mm, in particular less the 10 mm. Such a homogeneous color-mixed reading light output may be perceived as particularly pleasant by the passengers using the aircraft passenger reading light.

The maximal spatial offset may be defined as the maximal offset between a projection of the first light output and the second light output onto a common plane. The common plane may be a horizontal plane that is located in the target zone of the respective pair of light sources. The common plane may, for example, be defined by the upper surface of a table, which is associated with the respective passenger seat. The common plane may also be a virtual plane. The virtual plane may be oriented parallel to such a table, and it may be arranged in some distance above or below the table.

In an embodiment, the first light source, the second light source, the first optical system, and the second optical system are arranged and configured such that, at a distance of 50 cm from the aircraft passenger reading light, the minimal spatial offset between first light output and the second light output is more than 1 mm, in particular more than 2 mm, more particularly more than 5 mm. With such minimal spatial offsets, production and assembly tolerances of the components of the aircraft passenger reading light may be accepted, while still achieving a particularly pleasant reading light output. Stated differently, slight offsets between the first light output and the second light output may be acceptable, because they are not perceived as unpleasant by the passengers, while they may allow for the manufacturing of the aircraft passenger reading light to not be subject to excessive manufacturing requirements.

Each of the first and second optical systems may include at least one optical element for forming a light output from the light emitted by the respectively associated light source.

The at least one optical element may include at least one light transmissive optical element, such as a lens and/or a prism, an opaque optical element, such as a shutter and/or an opaque light tube; and/or a light reflective optical element, such as a mirror.

In an embodiment, each of the first and second optical systems includes a light transmissive optical element. Each of the first and second optical systems may in particular include a lens and/or a prism.

In an embodiment, each of the first and second optical systems includes a light reflective optical element. In particular, each of the first and second optical systems may include a combination of a light reflective optical element and a light transmissive optical element.

In an embodiment, for each of the plurality of pairs of light sources, at least one optical element of the first optical system and at least one optical element of the second optical system are formed integrally with each other. For example, a pair of optical systems, associated with a pair of light sources, may comprise an integrated lens structure, including a first lens of the first optical system and a second lens of the second optical system.

Alternatively or additionally, a pair of optical systems, associated with a pair of light sources, may comprise an integrated prism structure, comprising a first prism, belonging to the first optical system, and a second prism, belonging to the second optical system.

Alternatively or additionally, a pair of optical systems, associated with a pair of light sources, may comprise an integrated reflector structure, which comprises a first reflective element, belonging to the first optical system, and a second reflective element, belonging to the second optical system.

It is also possible that multiple optical elements of optical systems, associated with different pairs of light sources, are combined with each other/formed integrally with each other.

In an embodiment, the aircraft passenger reading light comprises an integrated lens structure, comprising the first lenses and/or the second lenses of multiple optical system, which are associated with different pairs of light sources.

In an embodiment the aircraft passenger reading light comprises an integrated prism structure, comprising the first prisms and/or the second prisms of multiple optical systems, which are associated with different pairs of light sources.

In an embodiment, the aircraft passenger reading light comprises an integrated reflector structure, comprising the first reflectors and/or the second reflectors of multiple optical systems, which are associated with different pairs of light sources.

Combining a plurality of optical elements of multiple optical systems, which are associated with different pairs of light sources, in a single structure may allow for simplifying the manufacturing and/or the assembly of an aircraft passenger reading light according to an exemplary embodiment of the invention.

According to an embodiment, for each of the plurality of pairs of light sources, the first optical system and the second optical system are formed separately from each other.

In an embodiment, the plurality of pairs of light sources comprise at least one group of pairs of light sources, wherein the respective pair-specific reading zones of a particular group of pairs of light sources are laterally offset from each other. A particular group of pairs of light sources may in particular be offset in a first direction, which may be a lateral direction of the aircraft, when the aircraft passenger reading light is installed in the passenger cabin of an aircraft. The respective pair-specific reading zones of a particular group of pairs of light sources may in particular be associated with different passenger seats of a particular passenger seat row location, in order to provide reading illumination to the different passenger seats.

The particular passenger seat row location may be a passenger seat row mounting position, and/or the particular passenger seat row location may be defined as the relative position of a passenger seat row with respect to the aircraft passenger reading light.

In an embodiment, the plurality of pairs of light sources comprise multiple groups of pairs of light sources, wherein the respective pair-specific reading zones of different ones of the multiple groups of pairs of light sources are offset in a second direction from each other. The second direction may coincide with a longitudinal direction of the aircraft, when the aircraft passenger reading light is installed within the passenger cabin of the aircraft.

The different passenger seat row locations may correspond to different passenger seat row mounting positions and/or to different relative positions of the passenger seat row with respect to the aircraft passenger reading light.

The respective pair-specific reading zones of different ones of the multiple groups of pairs of light sources may in particular be associated with different passenger seat row locations along the longitudinal direction of the aircraft.

In an embodiment, the plurality of pairs of light sources and the respective first and second optical systems are arranged in an array arrangement, wherein the multiple groups of pairs of light sources and the respective first and second optical systems are in particular arranged in adjacent building blocks along the array arrangement.

The pairs of light sources may in particular be arranged in a rectangular array arrangement, comprising a plurality of rows and a plurality of columns. The light source arrangement may, for example, comprise three to five rows and/or three to five columns. Light source arrangements according to exemplary embodiments of the invention are, however, not restricted to such configurations and may comprise less than three or more than five rows and columns. Such rectangular arrangement may allow for a particularly high packing density of the light sources and optical systems.

In an embodiment, the plurality of pairs of light sources and the respective first and second optical systems are arranged in a longitudinal arrangement, wherein the multiple pairs of light sources and the corresponding optical systems are arranged along a longitudinal direction of the aircraft passenger reading light.

The pairs of light sources and the corresponding optical systems may, in particular, be arranged in a linear arrangement, in which all light sources and the corresponding optical systems are arranged substantially along a straight line.

It is also possible that all first light sources are arranged substantially along a first line of light sources, and that all second light sources are arranged substantially along a second line of light sources. The second line of light sources may, in particular, extend parallel to the first line of light sources. In such an arrangement, the first and second light sources of each pair of light sources may be arranged on a common transverse line, which extends at an angle with respect to the longitudinal direction of the aircraft passenger reading light. The transverse line may, in particular, extend perpendicular to the longitudinal direction of the aircraft passenger reading light, as indicated above.

Arranging the light sources in a longitudinal arrangement may result in a very compact, space saving configuration of the aircraft passenger reading light. In particular, the elongated nature in the longitudinal direction may allow for a particularly compact design in other dimensions. In this way, a particularly low height of the aircraft passenger reading light may be achieved, which may be particularly good in embodiments where the aircraft passenger reading light is included in a low height passenger service unit.

In an embodiment, for each of the plurality of pairs of light sources, the first and second light outputs are substantially aligned with a main light output direction of the first and second light sources. In other words, the light output from the first and second light sources does not substantially change its general direction for forming the light output of the aircraft passenger reading light.

The main light output direction of the first and second light sources may, for example, not change its direction by more than 45°, more particularly by not more than 20°. Such an embodiment may allow for a configuration of the aircraft passenger reading light having a comparably simple geometry. It may also have a low risk of reducing the intensity of the light output of the aircraft passenger reading light due to losses, which may be caused by reflection.

In an embodiment, for each of the plurality of pairs of light sources, the first and second light outputs are angled with, in particular substantially perpendicular to, a main light output direction of the first and second light sources. Such an embodiment may allow for a particularly space saving, compact configuration of the aircraft passenger reading light. Reflective optical elements, which may be part of the optical systems, may be employed for re-directing the first and second light outputs. In particular, the aircraft passenger reading light may be kept particularly compact in a particularly critical dimension, such as the height dimension, when employed in a low height passenger service unit.

In an embodiment, the first color is warm white, in particular warm white having a color temperature in the range of between 2700 K and 3600 K; and the second color is cold white, in particular cold white having a color temperature in the range of between 4500 K and 6000 K.

Such an embodiment allows the aircraft passenger reading light to emit light of white color having different color temperatures. The aircraft passenger reading light may in particular allow for an adaptation between a comparably warm white reading light output and a comparably cold white reading light output by selecting particular relative light intensities of the first and second light sources. The aircraft passenger reading light may further be configured for providing a range of intermediate white light outputs, i.e. white reading light outputs, which are warmer than cold white, i.e. warmer than the second color, but colder than warm white, i.e. colder than the first color, by dimming/controlling the first light sources and the second light sources accordingly. In this way, an aircraft operator may set the reading light outputs to a desired light color.

The color temperature of the intermediate white light output may be selectively set to a predefined color temperature between warm white and cold white by setting the intensity of the first light outputs, emitted by the first light sources, to a first predefined intensity and by setting the intensity of the second light outputs, emitted by the second light sources, to a second predefined intensity.

In an embodiment, the first color may be white, and the second color may be a different color than white. The second color may, for example, be amber or pink. In such an embodiment, the color of the mixed-color reading light outputs, generated by the aircraft passenger reading light, may be adapted between white light and colored light by selectively controlling the first light sources and the second light sources.

The color of the mixed-color reading light outputs, generated by the aircraft passenger reading light, may be controlled in a gradual/continuous manner by setting the intensity of the light, emitted by the first light sources, and the intensity of the light, emitted by the second light sources, respectively.

In an embodiment, the aircraft passenger reading light comprises at least one dimmer for dimming the light intensity of the first light sources and/or for dimming the light intensity of the second light sources.

The aircraft passenger reading light may in particular comprise a first dimmer for for dimming the intensity of the first light outputs, emitted by first light sources, and the aircraft passenger reading light may comprise a second dimmer for dimming the intensity of the second light outputs, emitted by the second light sources, independently of the intensity of the light, emitted by first light sources.

Exemplary embodiments of the invention further include a method of operating an aircraft passenger reading light according to exemplary embodiments of the invention, wherein the method includes, for at least a subset of the plurality of pairs of light sources, in particular for a particular group of the plurality of pairs of light sources, simultaneously operating the first light source and the second light source for generating mixed-color reading light outputs in the respective pair-specific reading zones.

In an embodiment, the method may include, for at least the subset of the plurality of pairs of light sources, in particular for the particular group of the plurality of pairs of light sources, setting a light intensity for at least one of the first light source and the second light source for controlling the color of the reading light output of the aircraft passenger reading light.

With a method according to an exemplary embodiment of the invention, providing a mixed-color reading light output, having a desired color and/or a desired color temperature, may be achieved in a particularly convenient manner. Also, a wide range/continuous range of light colors may be readily available for the operator of the aircraft.

The additional features, modifications and effects, as described above with respect to the aircraft passenger reading light in accordance with exemplary embodiments of the invention, apply to the method of operating an aircraft passenger reading light in an analogous manner.

In an embodiment, each of the first and second light sources is an LED. LEDs provide reliable and efficient light sources at low costs.

In an embodiment, the aircraft passenger reading light further comprises a first power supply connector, a second power supply connector, and a third power supply connector for coupling the aircraft passenger reading light to an aircraft on-board power supply; and a multi-state switching arrangement having a plurality of switching states.

Each of the first light sources may comprise a first electrical terminal and a second electrical terminal, respectively. The first electrical terminals of the plurality of first light sources may be electrically coupled to the first power supply connector, and the second electrical terminals of the plurality of first light sources may be coupled via the multi-state switching arrangement to the second power supply connector.

In such an embodiment, each of the second light sources may comprise a first electrical terminal and a second electrical terminal, respectively. The first electrical terminals of the plurality of second light sources may be electrically coupled to the third power supply connector, and the second electrical terminals of the plurality of second light sources may be coupled via the multi-state switching arrangement to the second power supply connector.

Each of the plurality of switching states of the multi-state switching arrangement may permanently couple the second electrical terminals of the first and second light sources of a single group of the plurality of groups of the plurality of pairs of light sources to the second power supply connector. The multi-state switching arrangement may also permanently de-couple the second electrical terminals of the first and second light sources of the other groups of the plurality of pairs of light sources from the second power supply connector.

The multi-state switching arrangement may allow for adapting the aircraft passenger reading light to different longitudinal distances between the aircraft passenger reading light and the associated passenger seats by setting the multi-state switching arrangement appropriately. In consequence, the aircraft passenger reading light may be adapted to different longitudinal spacings between adjacent rows of passenger seats within a passenger cabin of an aircraft, without changing the positions of the aircraft passenger reading light.

As a result, the same type of aircraft passenger reading light may be employed in different types of passenger cabins, so that the number of different types of aircraft passenger reading lights, which need to be produced, may be reduced. Thus, the same type of aircraft passenger reading light may be produced in large numbers at comparably low costs. Also, re-configurations of the seating layout of the aircraft cabin may be made, without having to change the positions of the aircraft passenger reading lights.

It is noted that an aircraft passenger reading light according to exemplary embodiments of the invention is not intended for simultaneously providing passenger reading light illumination to a plurality of passenger seats that are arranged in different rows of passenger seats. An aircraft passenger reading light according to exemplary embodiments of the invention may allow, however, for adapting the reading light outputs of the aircraft passenger reading light to different distances/spacings between the respective aircraft passenger reading light and the associated passenger seats along the longitudinal direction of the aircraft. This may allow for easily adapting/setting the light outputs of the aircraft passenger reading light to different configurations of the passenger seats within the passenger cabin of the aircraft.

Exemplary embodiments of the invention further include an aircraft with a passenger cabin, comprising a plurality of passenger seats and a plurality of aircraft passenger reading lights, as described in any of the embodiments above. The aircraft passenger reading lights may in particular be arranged above the passenger seats for providing mixed-color reading light outputs to passengers sitting within the passenger seats.

BRIEF DESCRIPTION OF THE DRAWINGS

In the following, exemplary embodiments of the invention will be described with respect to the accompanying drawings, wherein.

DETAILED DESCRIPTION

Figure 1:
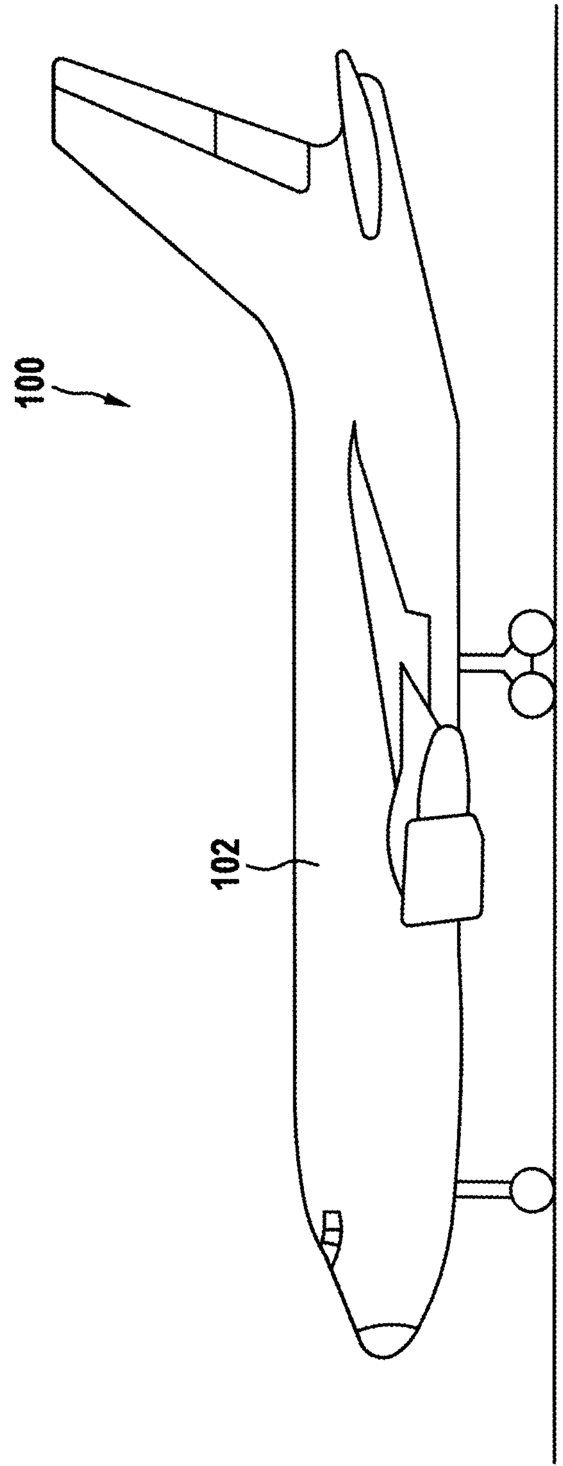
FIG. 1 shows a schematic side view of an aircraft in accordance with an exemplary embodiment of the invention, the aircraft having a passenger cabin.

FIG. 1 shows a schematic side view of an aircraft 100 in accordance with an exemplary embodiment of the invention, the aircraft 100 comprising a passenger cabin 102.

Figure 2A:
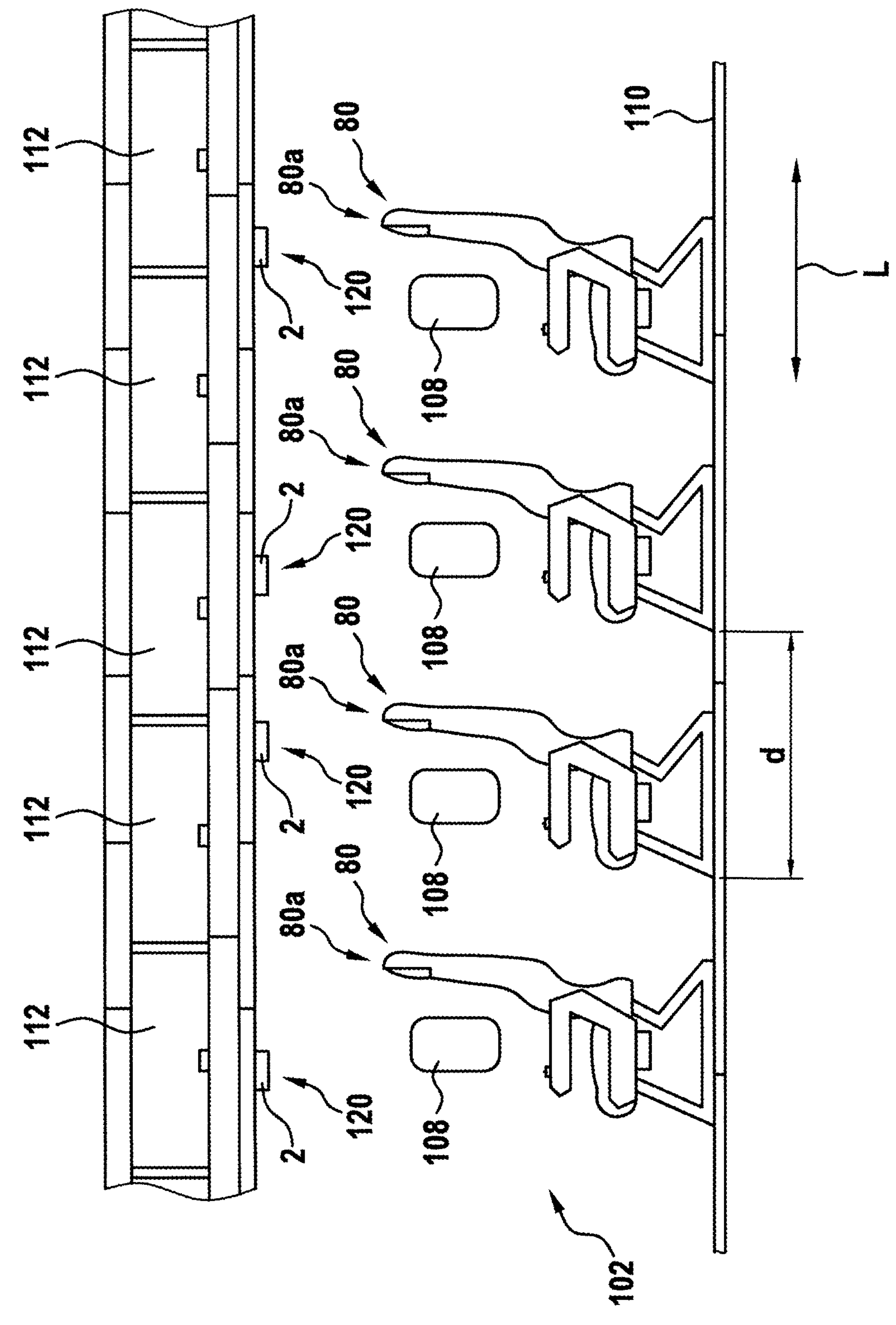
FIG. 2A shows a longitudinal cross-sectional view of a portion of the passenger cabin of the aircraft shown in FIG. 1.

FIG. 2A shows a longitudinal cross-sectional view of a portion of the passenger cabin 102 of the aircraft 100. FIG.

2B shows a partial cross-sectional view of the passenger cabin 102 in a plane which is oriented perpendicular to the longitudinal direction L.

Four seats 80*a*, also referred to as passenger seats 80*a*, are depicted in FIG. 2A. The passenger seats 80*a* are mounted to a floor 110 of the passenger cabin 102. Each of the depicted passenger seats 80*a* belongs to a different seating row 80. Each seating row 80 includes three passenger seats 80*a*, 80*b*, 80*c* (see FIG. 2B). The second and third passenger seats 80*b*, 80*c* of each seating row 80 are not visible in FIG. 2A, as they are arranged behind and therefore hidden by the depicted first passenger seats 80*a*.

For each of the seat rows 80, a window 108 is provided, which allows the passengers to view the outside of the aircraft 100. Further, a plurality of overhead baggage compartments 112, providing storage space for baggage, are shown.

A passenger service unit (PSU) 120 is arranged above each of the seat rows 80, respectively. Each PSU 120 may comprise gaspers, loudspeakers, emergency oxygen masks and service call buttons, which are not shown in FIGS. 2A and 2B.

In order to allow the passengers sitting in one of the passenger seats 80*a*-80*c* to read, even if the cabin light is dimmed down or switched-off, each PSU 120 further comprises a switchable aircraft passenger reading light 2, providing individual reading illumination to each passenger seat 80*a*-80*c*.

The distance/spacing d between the seating rows 80 in the longitudinal direction L of the passenger cabin 102 may differ, depending on the demands of the airline operating the respective aircraft 100. The seating rows 80 may, for example, be arranged at small distances d, in order to maximize the number of passengers fitting into the passenger cabin 102, when the aircraft 100 is operated by a low cost airline. On the other hand, the distances d between the seating rows 80 may be set larger, in order to provide more comfort to the passengers, when the aircraft 100 is operated by a premium airline.

For providing a convenient illumination to the passengers sitting in the passenger seats 80*a*-80*c*, the light outputs of the aircraft passenger reading lights 2 are adapted to the positions of the passenger seats 80*a*-80*c*, in particular adapted to the relative positioning between the aircraft passenger reading lights 2 and the multiple rows 80 of passenger seats 80*a*-80*c*.

The possible positions of the PSUs 120 and, thus, the positions of the reading lights 2, as part of the PSUs 120, in the longitudinal direction L may be restricted by the ceiling structure of the passenger cabin 102. The ceiling structure may in particular not allow for positioning the PSUs 120 at arbitrary positions along the longitudinal direction L, but only at a restricted number of predetermined positions.

In prior approaches, in order to provide a convenient reading illumination for different distances d between adjacent rows 80 of passenger seats 80*a*-80*c*, different types of PSUs 120 and/or different types of reading lights 2, having different light emission characteristics, have been used. Also, different types of reading lights 2 have been employed for providing convenient reading illumination for each of the different passenger seats 80*a*-80*c* in each seating row 80. Further, in prior approaches, the PSUs 120 have been moved and/or the reading lights have been replaced with different types of reading lights, when the seating rows 80 were re-configured.

In order to reduce the number of different types of reading lights 2, an aircraft passenger reading light 2 according to an exemplary embodiment of the invention comprises a plurality of light sources 6*a*, 6*b*, wherein the plurality of light sources 6*a*, 6*b* are arranged in a plurality of rows 61, 62, 63, wherein each of the rows 61, 62, 63 corresponds to a different relative position between the aircraft passenger reading light 2 and the associated seating row 80 in the longitudinal direction of the aircraft. In this way, the rows 61, 62, 63 of light sources may be used to account for different distances d between adjacent rows 80 of passenger seats 80*a*-80*c*. An exemplary arrangement of such multiple rows 61, 62, 63 of light sources 6*a*, 6*b* is depicted in FIG. 3.

The plurality of light sources 6*a*, 6*b* may be a plurality of LEDs.

Figure 2B:
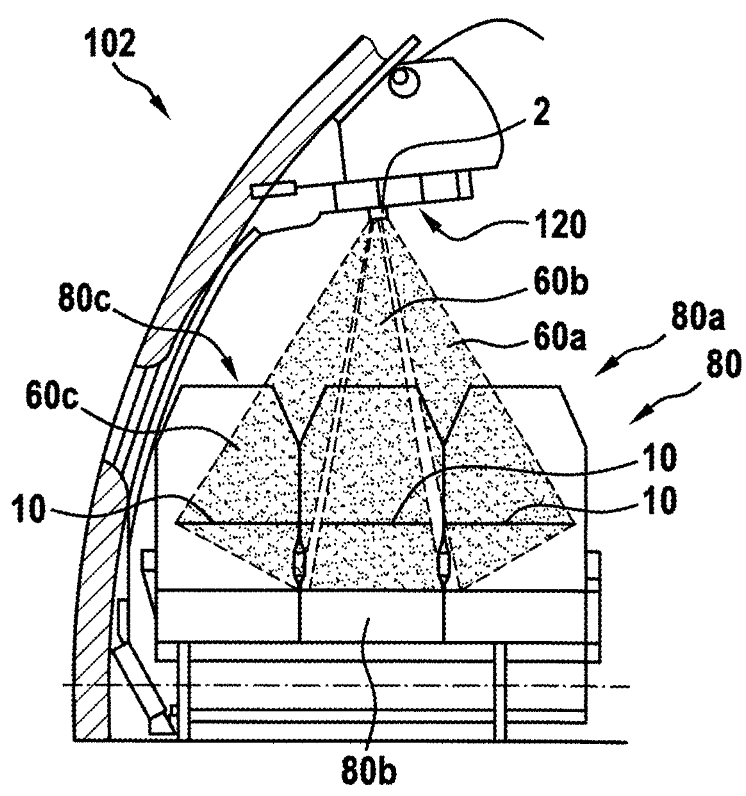
FIG. 2B shows a lateral cross-sectional view of a portion of the passenger cabin of the aircraft shown in FIG. 1.
Figure 3:
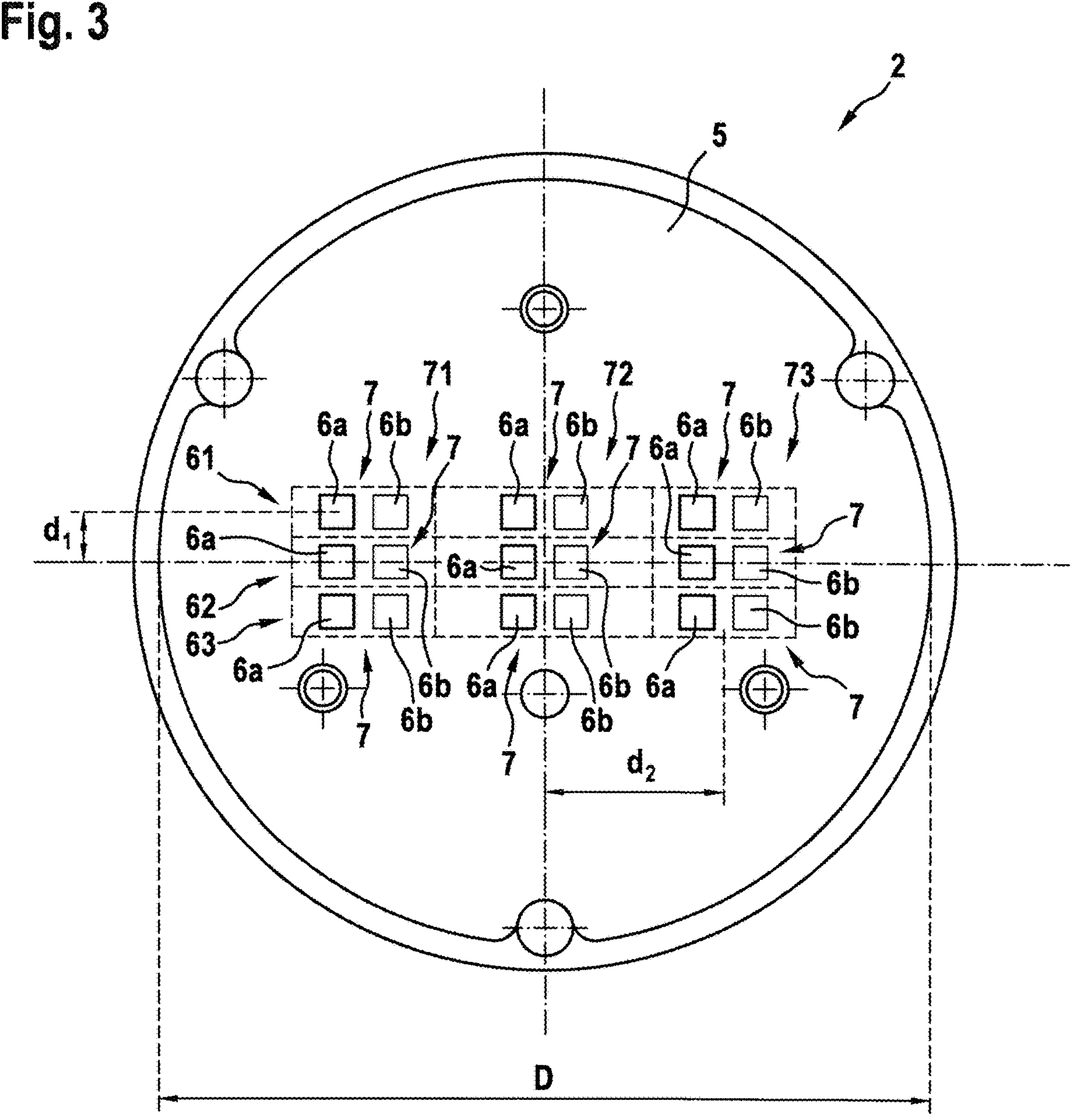
FIG. 3 shows a horizontal cross-sectional view of an aircraft passenger reading light according to an exemplary embodiment of the invention.

FIG. 3 depicts a cross-sectional view of an aircraft passenger reading light 2 according to an exemplary embodiment of the invention. In the illustration depicted in FIG. 3, the cross-sectional plane is oriented in a substantially horizontal manner, i.e. substantially parallel to the floor 110 of the passenger cabin 102, when the aircraft passenger reading light 2 is installed within the passenger cabin 102 above the passenger seats 80*a*-80*c*, as it is depicted in FIGS. 2A and 2B.

The aircraft passenger reading light 2 comprises a planar circuit board 5, in particular a printed circuit board (PCB) 5. The circuit board 5 extends basically horizontally, i.e. parallel to the floor 110 of the passenger cabin 102, when the aircraft passenger reading light 2 is installed within the passenger cabin 102 above the passenger seats 80*a*-80*c*. The circuit board 5 supports a plurality of light sources 6*a*, 6*b*.

In the embodiment depicted in FIG. 3, the circuit board 5 has a basically circular shape, having a diameter D of, for example, 40 mm to 50 mm, in particular a diameter D of 45 mm, around a central axis A. When the aircraft passenger reading light 2 is installed within the passenger cabin 102, the central axis A is oriented basically vertically, i.e. perpendicular to the floor 110 of the passenger cabin 102.

In the embodiment depicted in FIG. 3, the light sources 6*a*, 6*b* are arranged in pairs 7 of light sources 6*a*, 6*b*, with each pair 7 of light sources 6*a*, 6*b* comprising a first light source 6*a* and a second light source 6*b*, respectively. In the depicted exemplary embodiment of FIG. 3, the aircraft passenger reading light 2 comprises nine pairs 7 of light sources 6*a*, 6*b*. The pairs 7 of light sources 6*a*, 6*b* are arranged in a rectangular array arrangement, comprising three rows 61, 62, 63 and three columns 71, 72, 73.

In further embodiments, which are not explicitly shown in the figures, the aircraft passenger reading light 2 may comprise more or less than three rows 61, 62, 63 of pairs 7 of light sources 6*a*, 6*b* and/or more or less than three columns 71, 72, 73 of pairs 7 of light sources 6*a*, 6*b*. The light source arrangement may in particular comprise three to five rows and/or three to five columns of pairs 7 of light sources 6*a*, 6*b*.

The distance $d_1$ between the rows 61, 62, 63 may be in the range from 2 mm to 5 mm, the distance $d_1$ may in particular be 3 mm. The distance $d_2$ between the columns 71, 72, 73 may be in the range from 9 mm to 15 mm, the distance $d_2$ may in particular be 11 mm.

Each of the columns 71, 72, 73 of the pairs 7 of light sources 6*a*, 6*b* is associated with one of the passenger seats 80*a*-80*c* in each seating row 80. In an exemplary configuration, the light sources 6*a*, 6*b* in the first column 71 may be arranged for providing reading illumination 60*a* in a reading zone 10 of an aisle seat 80*a*, the light sources 6*a*, 6*b* in the second column 72 may be arranged for providing reading illumination 60*b* in a reading zone 10 of a middle seat 80*b*, and the light sources 6*a*, 6*b* in the third column 73 may be arranged for providing reading illumination 60*c* in a reading zone 10 of a window seat 80*c*, respectively (cf. FIG. 2B).

Further, each of the rows 61, 62, 63 of the pairs 7 of light sources 6*a*, 6*b* may be associated with a different distance in the longitudinal direction L between the aircraft passenger reading light 2 and the corresponding seating row 80. In this way, different distances/spacings between seating rows 80 may be implemented, without having to position each aircraft passenger reading light 2 in a predefined position with respect to the associated seating row 80. In particular, the rows 61, 62, 63 may be selectively made use of, in order to account for different distances d between adjacent rows 80 of passengers seats 80*a*-80*c*.

Stated differently, providing a plurality of rows 61, 62, 63 of pairs 7 of light sources 6*a*, 6*b* may allow for using the same aircraft passenger reading light 2 in combination with different passenger seat arrangements. In particular, the plurality of rows 61, 62, 63 may allow for using the same aircraft passenger reading light 2 in combination with passenger seat arrangements having different distances d between adjacent rows 80 of passenger seats 80*a*-80*c*.

The different rows 61, 62, 63 of pairs 7 of light sources 6*a*, 6*b* may further allow for using the same aircraft passenger reading light 2 in cases where the mounting position of the PSU is constrained to positions somewhat in front of or somewhat behind the seating row in the longitudinal direction L of the aircraft. Further, the different rows 61, 62, 63 of pairs 7 of light sources 6*a*, 6*b* may allow for leaving the aircraft passenger reading light 2 in the same position, when the seating rows 80 are re-arranged at some point during the life cycle of the aircraft, thus keeping the re-configuration efforts low. This feature will be discussed in more detail below with reference to FIGS. 5 and 6.

The plurality of rows 61, 62, 63 of pairs 7 of light sources 6*a*, 6*b* are also referred to as a plurality of groups of pairs 7 of light sources 6*a*, 6*b* herein.

Of each pair 7 of light sources 6*a*, 6*b*, the first light sources 6*a* are configured for emitting light having a first color, and the second light sources 6*b* are configured for emitting light having a second color that differs from the first color.

With the first light sources 6*a* being of a different color than the second light sources 6*b*, the light outputs of the pairs 7 of light sources 6*a*, 6*b* of an aircraft passenger reading light 2 according to an exemplary embodiment of the invention may be mixed-color reading light outputs, wherein the color of the mixed-color reading light outputs may be controlled by independently operating the first light sources 6*a* and the second light sources 6*b*.

In an embodiment, the first color may, for example be warm white, in particular warm white having a color temperature in the range from 2700 K to 3600 K; and the second color may be cold white, in particular cold white having a color temperature in the range of from 4500 K to 6000 K.

In such an embodiment, the aircraft passenger reading light 2 may output different shades of white light, ranging from a warm white reading light output, when activating only the first light sources 6*a*, to a cold white reading light output, when activating only the second light sources 6*b*.

By activating both, the first and second light sources 6*a*, 6*b*, the aircraft passenger reading light 2 may output an intermediate white light output, i.e. an output of white light, which is warmer than cold white, but colder than warm white. By gradually/continuously controlling the intensity of the light emitted by the first and second light sources 6*a*, 6*b*, respectively, the color temperature of the intermediate white light output may be gradually or continuously controlled between warm white and cold white.

In another embodiment, the first color may be white, and the second color may be a different color than white. The second color may, for example, be amber or pink. In such an embodiment, the color of the mixed-color reading light output of the aircraft passenger reading light 2 may be controlled by gradually or continuously controlling the intensity of the light emitted by the first and second light sources 6*a*, 6*b*.

For a pleasant user experience, it is desirable that the light outputs of the first and second light sources 6*a*, 6*b* of each pair 7 of light sources 6*a*, 6*b* overlap as much as possible in a pair-specific reading zone 10 (cf. FIG. 2B), i.e. in a reading zone 10 that is associated with the respective pair 7 of light sources 6*a*, 6*b*. With a large overlap, a passenger that sits in one of the passenger seats 80*a*, 80*b*, 80*c* and uses the aircraft passenger reading light 2 may notice only a homogeneous mixed-color reading light output, but not the individual first and second light outputs having different colors.

In order to provide a highly homogeneous mixed-color reading light output, an aircraft passenger reading light 2 according to an exemplary embodiment of the invention comprises a plurality of optical systems 8*a*, 8*b*, which are associated with the first and second light sources 6*a*, 6*b*.

In particular, the aircraft passenger reading light 2 comprises, for each pair 7 of light sources 6*a*, 6*b*: a first optical system 8*a* for forming a first light output from the light emitted by the first light source 6*a*; and a second optical system 8*b* for forming a second light output from the light emitted by the second light source 6*b*.

The first and second optical systems 8*a*, 8*b* are not visible in FIG. 3, since they are arranged above the plane of the cross-sectional view depicted in FIG. 3. Exemplary embodiments of first and second optical systems 8*a*, 8*b* are, however, depicted in FIGS. 4, 7, 8, and 9.

The first light source 6*a*, the second light source 6*b*, the first optical system 8*a*, and the second optical system 8*b* are arranged and configured for directing the first light output and the second light output to a pair-specific reading zone 10 (cf. FIG. 2B), which is associated with the respective pair 7 of light sources 6*a*, 6*b*, such that the first light output and the second light output at least partially overlap and provide a mixed-color reading light output in the pair-specific reading zone 10.

Figure 4:
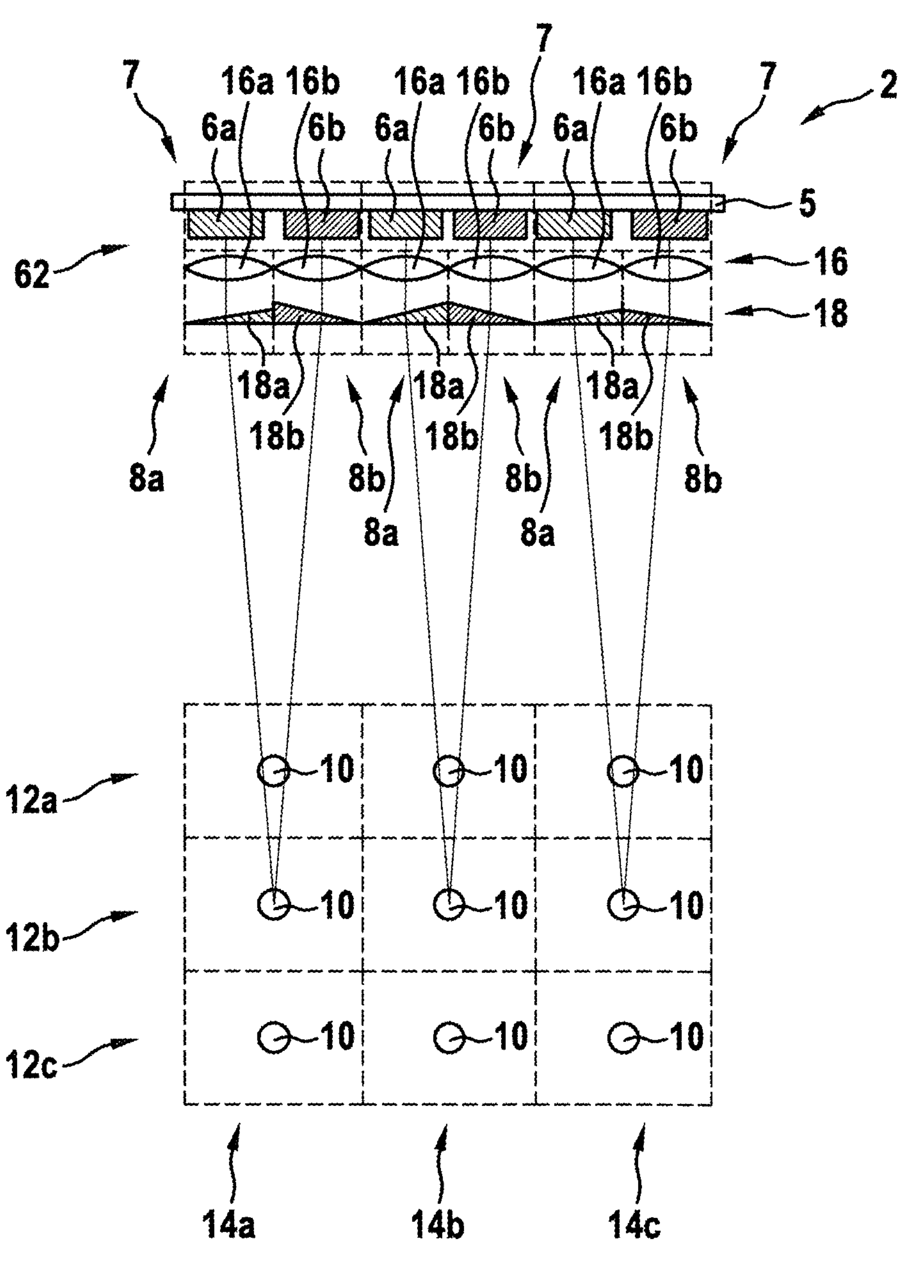
FIG. 4 shows a schematic vertical cross-sectional view of an aircraft passenger reading light according to an exemplary embodiment of the invention.

FIG. 4 depicts, in the upper portion, a schematic cross-sectional view of the aircraft passenger reading light 2 shown in FIG. 3, wherein the cross-sectional plane of the cross-sectional view is oriented perpendicular to the cross-sectional plane of FIG. 3. In other words, in the illustration depicted in FIG. 4, the cross-sectional plane of the cross-sectional view is oriented basically vertically, i.e. perpendicular to the floor 110 of the passenger cabin 102, when the aircraft passenger reading light 2 is installed within the passenger cabin 102 above the passenger seats 80*a*-80*c*, as it is depicted in FIGS. 2A and 2B.

Only a single row/group 62 of the plurality of rows/groups 61, 62, 63 of pairs 7 of light sources 6*a*, 6*b*, which are supported by the circuit board 5, is visible in the cross-sectional view depicted in FIG. 4.

A plurality of reading zones 10 are schematically illustrated in the lower portion of FIG. 4. The reading zones 10 are arranged in a rectangular array arrangement, comprising three rows 12*a*, 12*b*, 12*c* and three columns 14*a*, 14*b*, 14*c*. The depicted nine reading zones 10 correspond to the three rows 61, 62, 63 and three columns 71, 72, 73, in which the pairs 7 of light sources 6*a*, 6*b* are arranged on the circuit board 5, as it is depicted in FIG. 3.

The rectangular arrangement of the pairs 7 of light sources 6*a*, 6*b* as well as of the reading zones 10 is only exemplary. Depending on the specific situation in a particular passenger cabin 102, different arrangements of the pairs 7 of light sources 6*a*, 6*b* and/or different arrangements of the reading zones 10 are possible as well.

The pairs 7 of light sources 6*a*, 6*b*, as depicted in FIG. 4, are arranged for illuminating the reading zones 10 of the second row 12*b* of reading zones 10. Additional pairs 7 of light sources 6*a*, 6*b*, which as not visible in FIG. 4, are configured for illuminating the reading zones 10 of the first row 12*a* and of the third row 12*c* of reading zones 10, respectively.

The reference numeral 10 points towards comparably small dots in FIG. 4. This representation illustrates that a highly accurate overlapping of the first and second light outputs may be achieved per pair-specific reading zone 10. It is understood that the reading zones 10 may be more extensive. For example, the reading zones 10 may extend across the entire rectangles indicated in FIG. 4. Also, FIG. 2B illustrates extended reading zones 10.

Three pairs 7 of light sources 6*a*, 6*b* are associated with each column 14*a*, 14*b*, 14*b* of the plurality of reading zones 10, as can be appreciated from a joint observation of FIGS. 3 and 4.

Two optical systems 8*a*, 8*b* are associated with each pair 7 of light sources 6*a*, 6*b*. For each pair 7 of light sources 6*a*, 6*b*, the two optical systems 8*a*, 8*b* are referred to as a first optical system 8*a* and a second optical system 8*b*.

The optical systems 8*a*, 8*b* are arranged and configured for directing the light of the first light source 6*a*, and the light of the second light source 6*b* of the respective pair 7 of light sources 6*a*, 6*b* to the pair-specific reading zone 10, such that the first light output and the second light output at least partially overlap, providing a mixed-color reading light output in the pair-specific reading zone 10.

For providing a highly homogeneous mixed-color reading light output, the first light source 6*a*, the second light source 6*b*, the first optical system 8*a* and the second optical system 8*b* are in particular arranged and configured for minimizing the deviation between the first light output and the second light output in each pair-specific reading zone 10.

In the exemplary embodiment depicted in FIG. 4, each optical system 8*a*, 8*b* comprises a lens 16*a*, 16*b* and a prism 18*a*, 18*b*, respectively.

Each first optical system 8*a* comprises a first lens 16*a* and a first prism 18*a* for directing the light of the respective first light source 6*a* into the pair-specific reading zone 10, associated with the respective pair 7 of light sources 6*a*, 6*b*.

Each second optical system 8*b* comprises a second lens 16*b* and a second prism 18*b* for directing the light of the second light source 6*b* into the pair-specific reading zone 10, associated with the respective pair 7 of light sources 6*a*, 6*b*.

The two lenses 16*a*, 16*b* of the two optical systems 8*a*, 8*b*, associated with a given pair 7 of light sources 6*a*, 6*b*, may be formed integrally with each other. Alternatively, they may be formed individually, i.e. separately from each other.

Similarly, the two prisms 18*a*, 18*b* of the two optical systems 8*a*, 8*b*, associated with a given pair 7 of light sources 6*a*, 6*b*, may be formed integrally with each other, or they may be formed individually, i.e. separately from each other.

It is also possible that a plurality of lenses 16*a*, 16*b*, which are associated with different pairs 7 of light sources 6*a*, 6*b*, are formed integrally with each other, forming an integrated lens structure 16 that comprises all the lenses 16*a*, 16*b* for a row of light sources 6*a*, 6*b* and/or all the lenses 16*a*, 16*b* for a column of light sources 6*a*, 6*b*, respectively.

It is also possible that a plurality of prisms 18*a*, 18*b*, which are associated with different pairs 7 of light sources 6*a*, 6*b*, are formed integrally with each other, forming an integrated prism structure 18 that comprises all the prisms 18*a*, 18*b* for a row of light sources 6*a*, 6*b* and/or all the prisms 18*a*, 18*b* for a column of light sources 6*a*, 6*b*, respectively.

Although, in FIG. 4, only lenses 16*a*, 16*b* and prisms 18*a*, 18*b* are depicted as examples for optical elements, the optical systems 8*a*, 8*b* of an aircraft passenger reading light 2 according to exemplary embodiments of the invention are not restricted to such configurations. Alternatively and/or additionally, the optical systems 8*a*, 8*b* may comprise other optical elements, such as shutters and/or reflectors 20.

Figure 5:
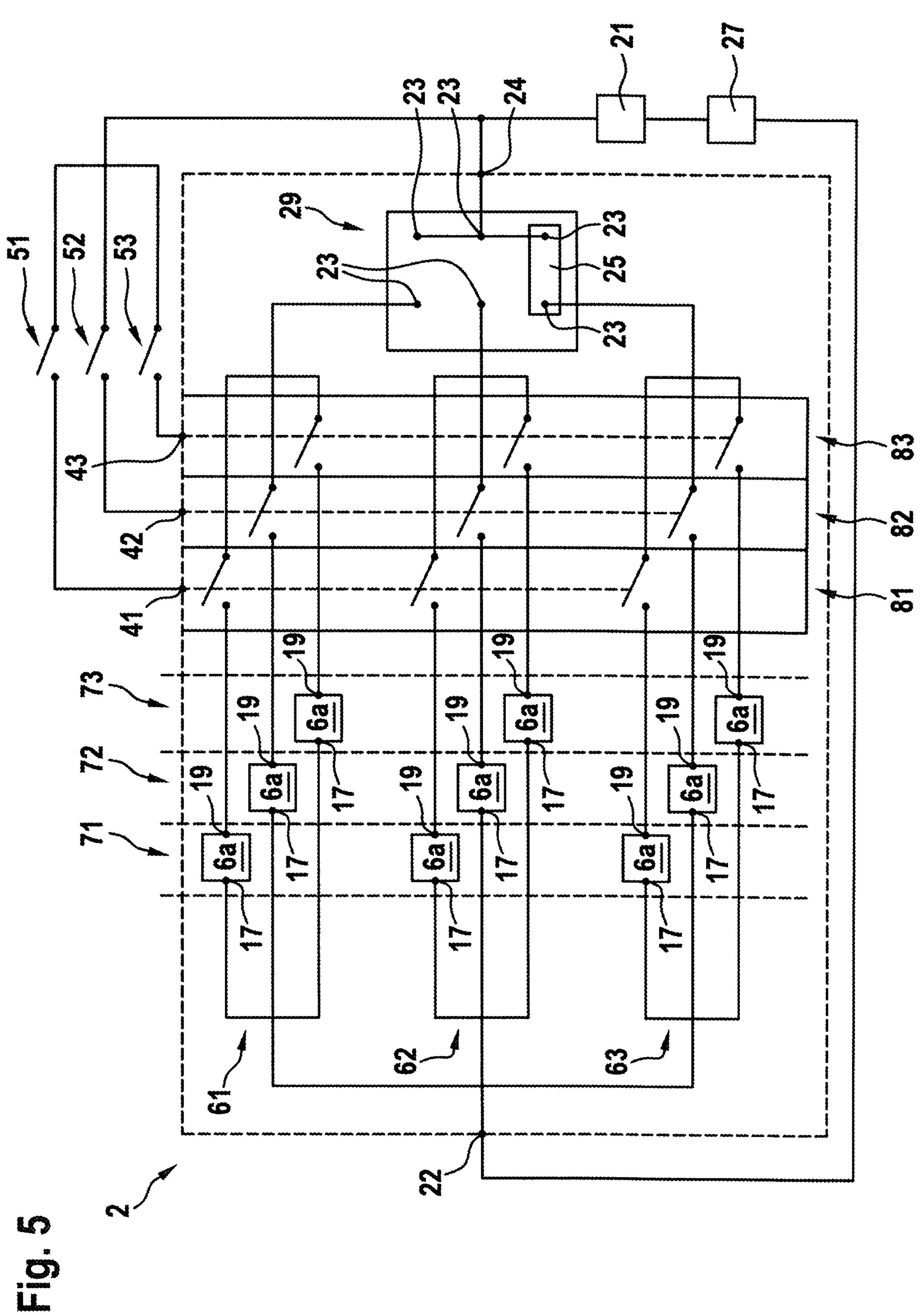
FIG. 5 shows a schematic circuit diagram of selected components of an aircraft passenger reading light according to an exemplary embodiment of the invention.

FIG. 5 shows a schematic circuit diagram of selected components of an aircraft passenger reading light 2 according to an exemplary embodiment of the invention. In particular, FIG. 5 shows a part of the electric circuitry that is configured for selectively driving the first light sources 6*a*.

The aircraft passenger reading light 2 comprises a first power supply connector 22 and a second power supply connector 24, which are configured for being connected to electric power supply outputs of an electric aircraft on-board power supply 21 of the aircraft 100. Each of the first light sources 6*a* comprises a first electrical terminal 17 and a second electrical terminal 19, respectively. The first electrical terminals 17 of all first light sources 6*a* are electrically connected to the first power supply connector 22.

The second electrical terminals 19 of the first light sources 6*a* are electrically coupled to the second power supply connector 24 via a multi-stage switching arrangement 29. The multi-stage switching arrangement 29 is configured for selectively coupling only the second electrical terminals 19 of the first light sources 6*a* of a selected single row/group 61, 62, 62 of the first light sources 6*a* to the second power supply connector 24.

This selection of a single row/group 61, 62, 62 of first light sources 6*a* may be done before or at the time the aircraft passenger reading light 2 is installed within the passenger cabin 102 of the aircraft 100. The single one of the rows/groups 61, 62, 62 of first light sources 6*a* is selected depending on the position of the aircraft passenger reading light 2 with respect to the associated seating row 80. The selection may in particular be made depending on the distance between the aircraft passenger reading light 2 and the associated seating row 80 in the longitudinal direction L of the passenger cabin 102, in order to provide an optimized illumination of the associated passenger seats 80*a*-80*c*.

Figure 6:
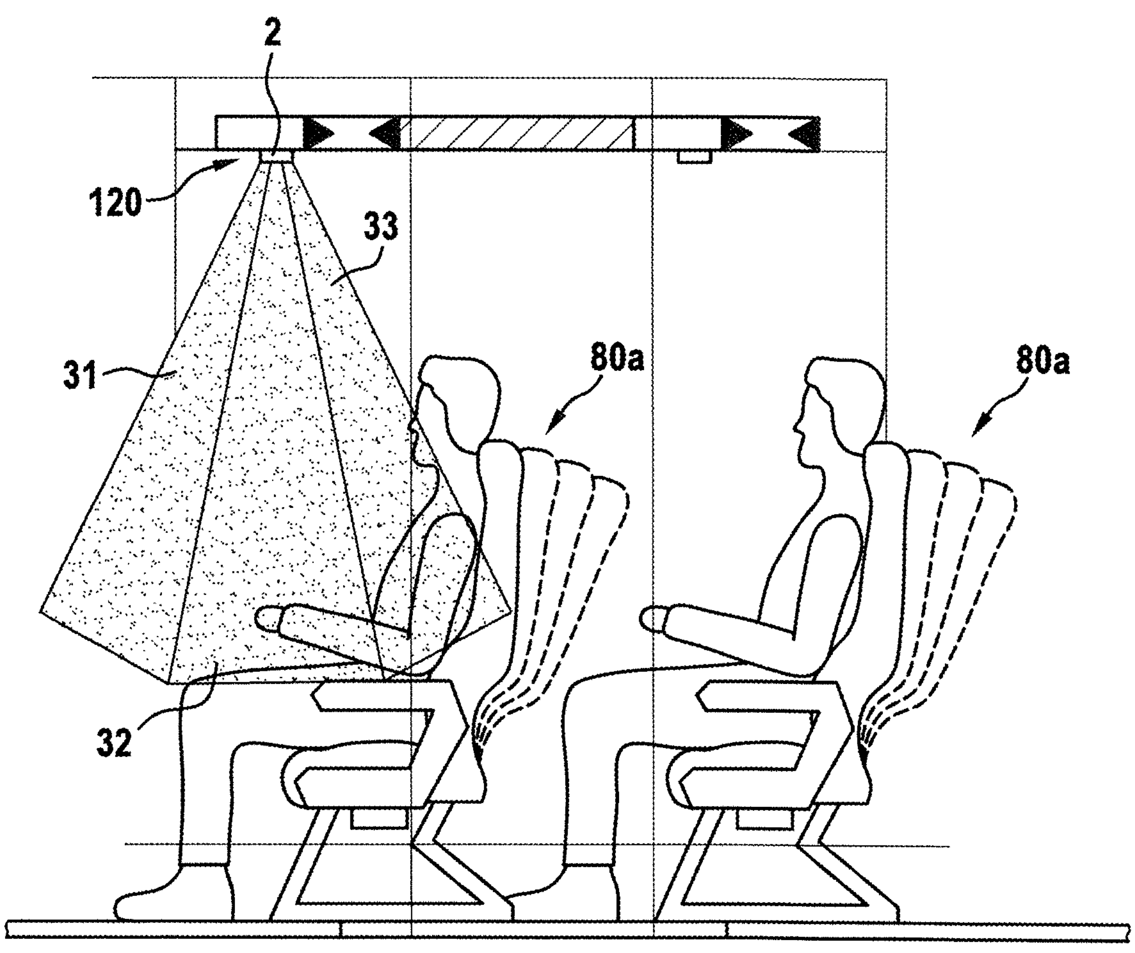
FIG. 6 shows a schematic longitudinal cross-sectional view through a portion of a passenger cabin of an aircraft with three exemplary light cones, as may be emit-ted by an aircraft passenger reading light according to an exemplary embodiment of the invention.

FIG. 6 schematically shows three light cones 31, 32, 33, which are emitted by the first light sources 6*a* of the respective rows 61, 62, 63 of the aircraft passenger reading light 2 according to an exemplary embodiment of the invention. For illustrative purposes, all three light cones 31, 32, 33 are shown in FIG. 6. However, when the aircraft passenger reading light 2 is actually installed, only the first light source 6*a* generating one of the light cones 31, 32, 33, in particular the light cone 31, 32, 33 providing the best illumination for the respective configuration of passenger seats 80*a*-80*c*, will be activated. I.e., only one of the light cones 31, 32, 33 will be generated, when the aircraft passenger reading light 2 is installed and operated within the passenger cabin 102 of an aircraft 100.

Turning back to FIG. 5, the multi-state switching arrangement 29 may be configured for permanently coupling the second power supply connector 24 of the aircraft passenger reading light 2 to the second electrical terminals 19 of the first light sources 6*a* of the selected row 61, 62, 63 of first light sources 6*a*. In the context of the present document, "permanently coupling" may be understood to mean that the selected connections are established once before or when the aircraft passenger reading light 2 is installed in the passenger cabin 102 of the aircraft 100 and that the selected connections are usually not changed, after the aircraft passenger reading light 2 has been installed in the passenger cabin 102. The selected connections can, in particular, not be changed by the passengers and/or the crew of the aircraft 100 during normal operation of the aircraft 100. The established connections may, however, be changed during maintenance of the aircraft 100, in particular when the seat configuration within the passenger cabin 102 is changed, resulting in different distances between the aircraft passenger reading lights 2 and the associated passenger seats 80*a*-80*c* in the longitudinal direction L of the aircraft 100.

The multi-state switching arrangement 29 may include a mechanical switch or a plurality of mechanical switches, which is/are switchable before or when the aircraft passenger reading light 2 is installed within the passenger cabin 102, but which is/are not readily accessible after the aircraft passenger reading light 2 has been installed within the passenger cabin 102. The mechanical switch(es) may in particular be operable only with the assistance of an appropriate switching tool, such as a screwdriver or a specific switching tool, similar to a key, which is specifically designed for switching the mechanical switch(es).

In an alternative configuration, the multi-state switching arrangement 29 may comprise a plurality of pins 23, electrically connected with the second electrical terminals 19 and the second power supply connector 24, respectively, and at least one pluggable electrical plug-connector 25, also referred to as "jumper" 25, which is configured to be put onto two adjacent pins 23 for providing an electrical connecting between these two pins 23.

In another alternative configuration, the multi-state switching arrangement 29 may be an electrically switchable multi-state switching arrangement 29, in particular an electromechanical and/or electronic multi-state switching arrangement 29, which may be switched into the desired configuration by applying an appropriate control signal ("configuration signal") to the multi-state switching arrangement 29, before or when the aircraft passenger reading light 2 is installed within the passenger cabin 102.

The configuration signal may be provided by an appropriate set-up tool, which is available in the factory and during maintenance of the aircraft 100, but not in the course of normal operation of the aircraft 100. In consequence, the configuration of the multi-state switching arrangement 29 may be set and changed only in the factory and/or during maintenance/reconfiguration of the aircraft 100.

The aircraft passenger reading light 2 further comprises a plurality of switching devices 81, 82, 83, which allow for selectively switching the individual first light sources 6*a* of the selected row 61, 62, 63 of first light sources 6*a*.

A switching device 81, 82, 83 is associated with each of the columns 71, 72, 73 of first light sources 6*a*, respectively. In consequence, the first light sources 6*a* of each column 71, 72, 73 may be switched on and off by operating the respectively associated switching device 81, 82, 83. Each switching device 81, 82, 83 comprises a passenger command input terminal 41, 42, 43 for receiving an input command from a passenger switch 51, 52, 53, associated with the respective passenger seat 80*a*, 80*b*, 80*c*.

The passenger switches 51, 52, 53 may be located next to the aircraft passenger reading light 2 within the PSU 120 above the passenger seats 80*a*, 80*b*, 80*c*, or in the armrests of the respective passenger seat 80*a*, 80*b*, 80*c*, or on a touch screen on the back side of a passenger seat in front of the respective passenger seat 80*a*, 80*b*, 80*c*, or in any other location that is conveniently accessible for the passenger from the passenger seat 80*a*, 80*b*, 80*c*.

In an aircraft passenger reading light 2 according to exemplary embodiments of the present invention, as it has been described before, the first light sources 6*a* are controlled by the multi-state switching arrangement 29 and the passenger switches 51, 52, 53 as follows:

Before or when the aircraft passenger reading light 2 is installed within the passenger cabin 102 of the aircraft 100, one of the rows 61, 62, 63 of first light sources 6*a* is selected by configuring the multi-state switching arrangement 29, so that it couples only the second electrical terminals 19 of the first light sources 6*a* of a single one of the rows 61, 62, 63 with the second power supply connector 24. The configuration of the multi-state switching arrangement 29 remains in this established configuration, after the aircraft passenger reading light 2 has been installed within the passenger cabin 102 of the aircraft 100.

The columns 71, 72, 73 of the arrangement of first light sources 6*a* correspond to the different passenger seats 80*a*, 80*b*, 80*c* within a single seating row 80. The first light sources 6*a* of the previously selected row 61, 62, 63 of first light sources 6*a* may be selectively and individually switched on and off by the passengers by operating the corresponding passenger switches 51, 52, 53. Every passenger controls only the first light sources 6*a* arranged in the column 71, 72, 73 associated with his/her passenger seat 80*a*, 80*b*, 80*c*. In consequence, only the first light source 6*a*, arranged in the pre-selected row 61, 62, 63 and in the column which is connected with the respective passenger switch 51, 52, 53, is switched on or off, when one of the passenger switches 51, 52, 53 is operated.

The aircraft passenger reading light 2 may comprise similar circuitry, which is not explicitly shown in the figures, for correspondingly driving the second light sources 6*b*.

The multi-stage switching arrangement 29 for selectively driving the first light sources 6*a*, the multi-stage switching arrangement 29 for selectively driving the second light sources 6*b*, and the switching devices 81, 82, 83 for switching the first and second light sources 6*a*, 6*b* may be mechanically and/or electrically coupled with each other, in order to ensure that the first and second light sources 6*a*, 6*b* of every pair 7 of light sources 6*a*, 6*b* are jointly activated and deactivated.

Alternatively, the second electrical terminals 19 of the first and second light sources 6*a*, 6*b* may be electrically coupled to the same switching devices 81, 82, 83, in order to ensure that the first and second light sources 6*a*, 6*b* of every pair 7 of light sources 6*a*, 6*b* are jointly activated and deactivated.

In such a configuration, the first electrical terminals 17 of the first light sources 6*a* may be electrically coupled to the first power supply connector 22, as it is depicted in FIG. 5, and the first electrical terminals of the second light sources 6*b*, which are not shown in FIG. 5, may be electrically coupled to a third power supply connector (not shown in FIG. 5), which is electrically coupled to the electric aircraft on-board power supply 21 or to an additional electric aircraft on-board power supply (not shown), which is configured for supplying electrical power to the second light sources 6*b*.

Aircraft passenger reading lights 2 according to exemplary embodiments of the invention may be adapted to different longitudinal distances between the aircraft passenger reading lights 2 and the associated passenger seats 80 by setting the multi-state switching arrangement 29 appropriately. In consequence, aircraft passenger reading lights 2 according to exemplary embodiments of the invention may be adapted to different distances between adjacent rows of passenger seats 80 within a passenger cabin 102 of an aircraft 100, without having to change the positions of the aircraft passenger reading lights 2.

As a result, the same type of aircraft passenger reading light 2 may be employed in different types of passenger cabins 102, so that the number of different types of aircraft passenger reading lights 2, which need to be produced, may be reduced. Thus, the same type of aircraft passenger reading light 2 may be produced in large numbers at comparably low costs. Also, re-configurations of the seating layout of aircraft cabins may be made, without having to change the positions of the aircraft passenger reading lights 2.

An aircraft passenger reading light 2 according to an exemplary embodiment of the invention is not intended for simultaneously providing passenger reading light illumination to a plurality of passenger seats 80*a*-80*c* that are arranged in different seating rows 80. An aircraft passenger reading light 2 according to an exemplary embodiment of the invention may allow, however, for adapting the reading light outputs of the aircraft passenger reading light 2 to different distances between the respective aircraft passenger reading light 2 and the associated passenger seats 80*a*-80*c* along the longitudinal direction L of the aircraft 100. This may allow for easily adapting the light outputs of the aircraft passenger reading light 2 to different configurations of the passenger seats 80*a*-80*c* within the passenger cabin 102 of the aircraft 100.

The aircraft passenger reading light 2 may further comprise at least one dimmer 27 for controlling the intensity of the light emitted by the first light sources 6*a* and/or for controlling the intensity of the light emitted by the second light sources 6*b*.

The aircraft passenger reading light 2 may in particular comprise a first dimmer 27 for controlling the intensity of the light emitted by the first light sources 6*a*, and a second dimmer (not shown) for controlling the intensity of the light emitted by the second light sources 6*b*.

The at least one dimmer may be coupled to one of the power supply connectors 22, 24. The at least one dimmer 27 may be integrated into the electric aircraft on-board power supply 21, or it may be provided separately form the electric aircraft on-board power supply 21, as it is shown in FIG. 5. The at least one dimmer 27 may, in particular, be part of the aircraft passenger reading light 2.

Independently controlling the intensity of the light emitted by the first and second light sources 6*a*, 6*b* may allow for adjusting the intensity and the color/color temperature of the light output of the aircraft passenger reading light 2 over a wide range. In particular, an aircraft operator may set the color of the reading light outputs of the aircraft passenger reading light 2 to a desired color/color temperature, without the need to build customized aircraft passenger reading lights. An adaptation to the requirements of an aircraft operator may be made, without having to modify or replace the hardware components of the aircraft passenger reading light 2.

Figure 7:
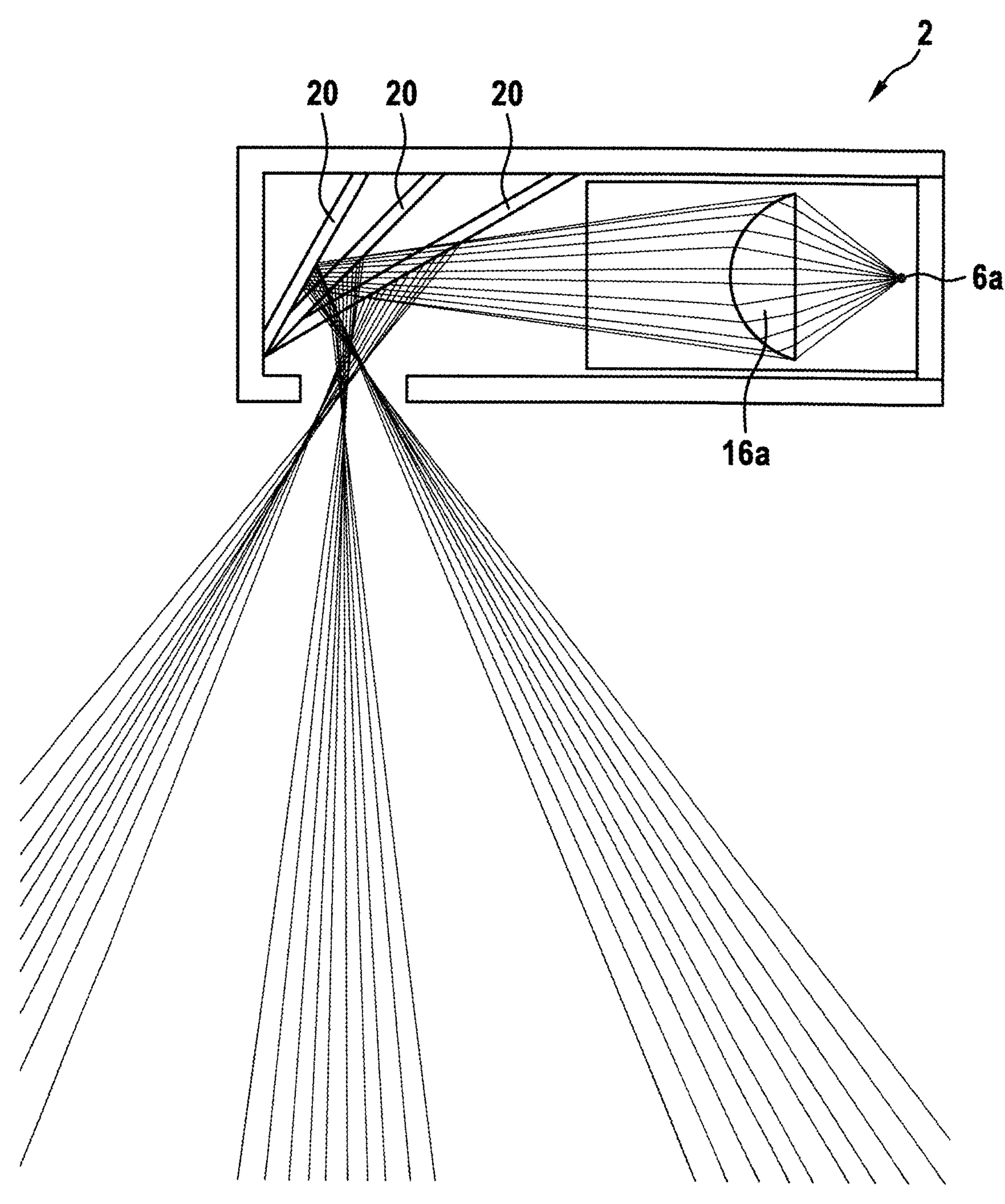
FIG. 7 shows a schematic, cut-open side view of selected components of a passenger reading light according to an exemplary embodiment of the invention comprising reflectors.
Figure 8:
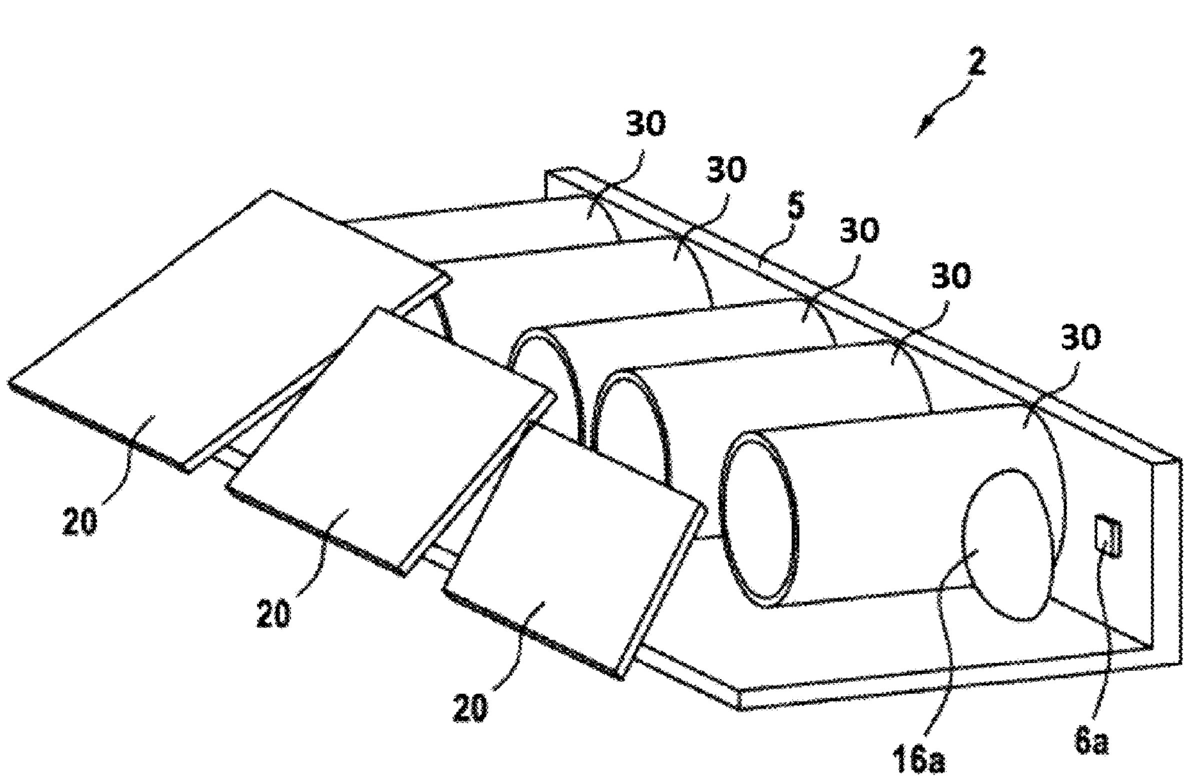
FIG. 8 shows a perspective view of a portion of the aircraft passenger reading light depicted in FIG. 7.

FIG. 7 depicts a schematic, cut-open side view of selected components of an aircraft passenger reading light 2 according to an exemplary embodiment of the invention. The depicted aircraft passenger reading light 2 comprises a plurality of reflectors 20. FIG. 8 depicts a perspective view of a portion of the aircraft passenger reading light 2 depicted in FIG. 7; and FIG. 9 depicts a schematic vertical cross-sectional view of such an aircraft passenger reading light 2.

Figure 9:
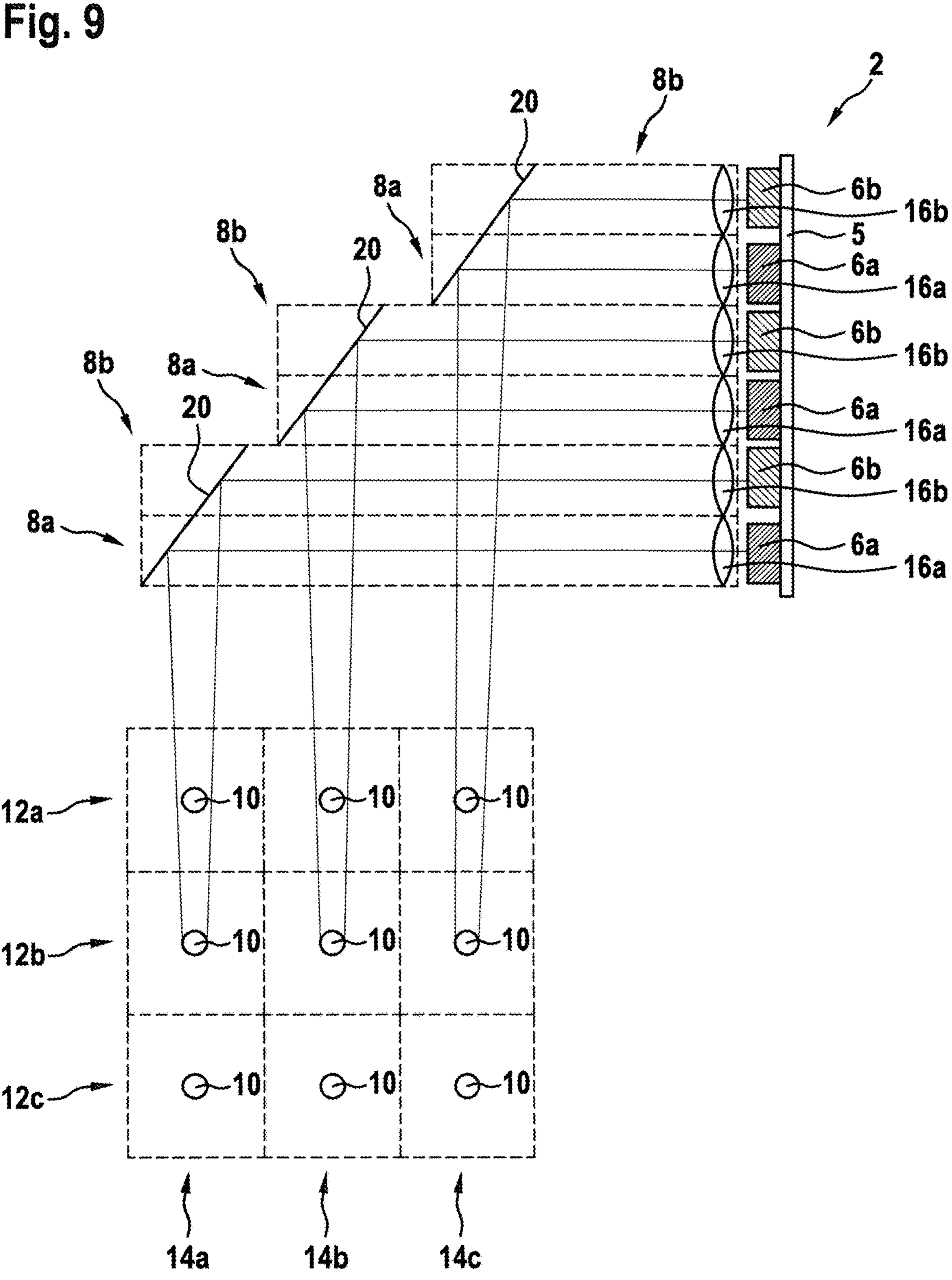
FIG. 9 shows a schematic vertical cross-sectional view of the aircraft passenger reading light shown in FIGS. 7 and 8.

Similar to FIG. 4, only three pairs 7 of light sources 6*a*, 6*b*, which a provided for illuminating a single row 12*b* of reading zones 10, are depicted in FIG. 9. In FIG. 8, three pairs 7 of light sources 6*a*, 6*b*, belonging to different groups of pairs 7 of light sources 6*a*, 6*b* are depicted. These three pairs 7 of light sources 6*a*, 6*b* correspond to different relative positions of the aircraft passenger reading light 2 and the seating row 80 for a single passenger seat. Only a single light source 6*a* of the portion of the aircraft passenger reading light 2 of FIG. 8 is visible in the cut-open side view depicted in FIG. 7.

Similar to the embodiment depicted in FIGS. 3 and 4, the aircraft passenger reading light 2, portions of which are depicted in FIGS. 7 to 9, may comprise additional pairs 7 of light sources 6*a*, 6*b*, which are not shown in FIGS. 7 to 9, for illuminating additional reading zones 10. It can be appreciated from the joint reading of FIGS. 8 and 9 that the aircraft passenger reading light 2 of FIGS. 7 to 9 can have a rectangular array of 3×3 pairs 7 of light sources 6*a*, 6*b*.

Figure 10:
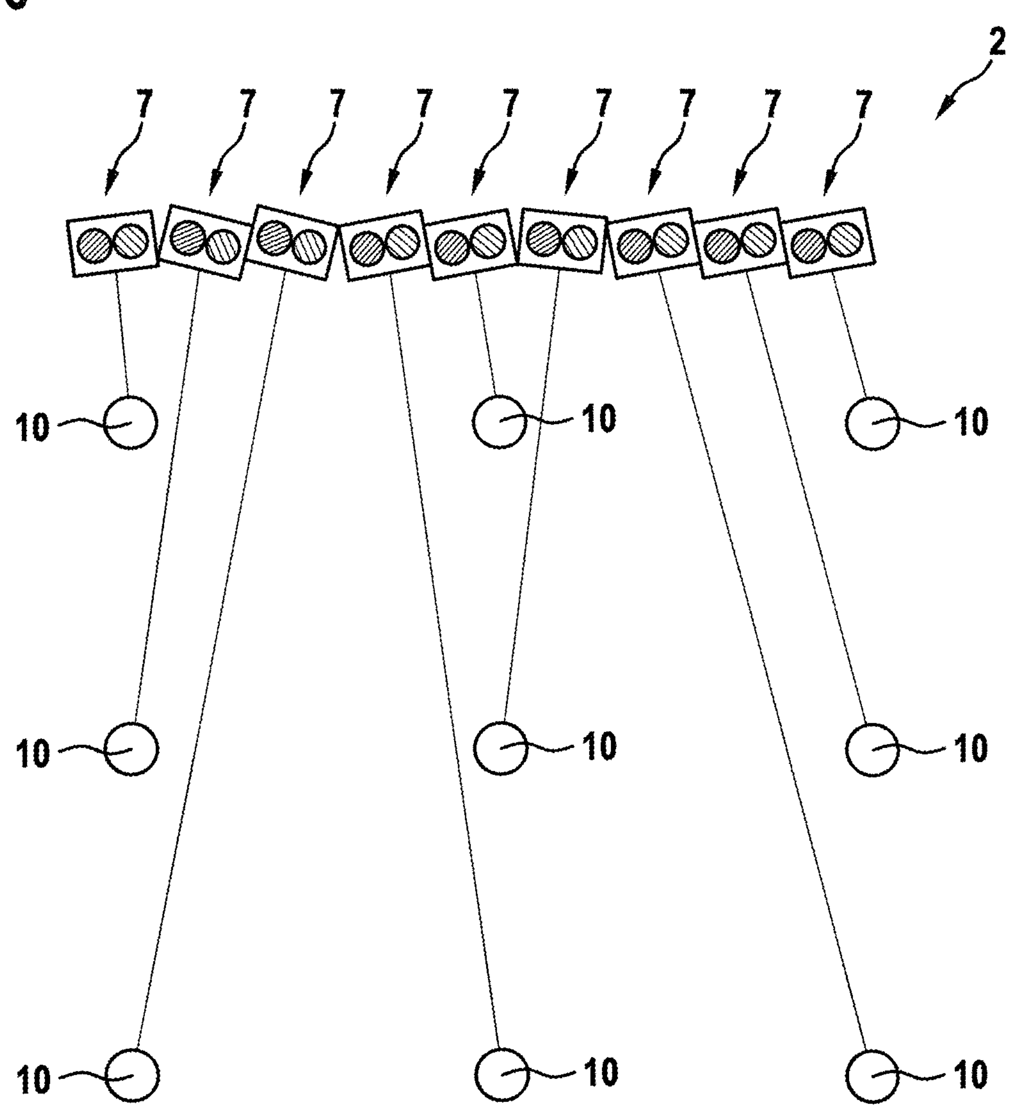
FIG. 10 shows a schematic view of an aircraft passenger reading light according to another embodiment of the invention, the aircraft passenger reading light comprising a plurality of pairs of light sources, arranged in a longitudinal arrangement.

As indicated above, the pairs 7 of light sources 6*a*, 6*b* of the aircraft passenger reading light 2 of FIGS. 7 to 9 may be arranged in an array arrangement, as it is depicted in FIG. 3. In an alternative embodiment, the pairs 7 of light sources 6*a*, 6*b* may be arranged in a longitudinal arrangement, in which all light sources 6*a*, 6*b* are arranged along a single, longitudinal direction. In an exemplary embodiment, three building blocks, as illustrated in FIG. 8, may be arranged side-by-side, such that a longitudinal arrangement of nine pairs 7 of light sources 6*a*, 6*b* is provided. Another example of a longitudinal arrangement of the pairs 7 of light sources 6*a*, 6*b* is schematically illustrated in FIG. 10.

Arranging the light sources 6*a*, 6*b* in a longitudinal arrangement may result in a very compact, space saving configuration of the aircraft passenger reading light 2. In particular, such an arrangement may allow for a particularly compact implementation in the height direction of the aircraft passenger reading light 2, which may be particularly beneficial in low height implementations of passenger service units.

The pairs 7 of light sources 6*a*, 6*b* may, in particular, be arranged in a linear arrangement, in which all light sources 6*a*, 6*b* are arranged along a single line of light sources 6*a*, 6*b*. It is also possible that all first light sources 6*a* are arranged along a first line of light sources 6*a*, and that all second light sources 6*b* are arranged along a second line of light sources 6*b*, which may, in particular, extend parallel to the first line of light sources 6*a*.

The first and second light sources 6*a*, 6*b* of each pair of light sources 7 may be arranged on a common transverse line, which extends at an angle with respect to the longitudinal direction of the the longitudinal arrangement. The transverse line may, in particular, extend perpendicular to the longitudinal direction of the the longitudinal arrangement.

As schematically depicted in FIG. 9, two optical systems 8*a*, 8*b* are associated with each of the pairs 7 of light sources 6*a*, 6*b*, respectively.

A first optical system 8*a* comprises a first lens 16*a* and a reflector 20 for directing the light of the first light source 6*a* into the pair-specific reading zone 10 associated with the respective pair 7 of light sources 6*a*, 6*b*.

A second optical system 8b comprises a second lens 16b and the reflector 20 for directing the light of the second light source 6b into the pair-specific reading zone 10 associated with the respective pair 7 of light sources 6a, 6b.

In the embodiment depicted in FIGS. 8 and 9, the same reflector 20 is used for re-directing the light outputs of the two light sources 6a, 6b of each pair 7 of light sources 6a, 6b, respectively. It is also possible that separate reflectors may be sued for each pair 7 of light sources 6a, 6b.

The reflectors 20 may be arranged in some distance from the light sources 6a, 6b and/or from the lenses 16a, 16b. The distance between the reflectors 20 and the light sources 6a, 6b may, for example, be in the range from 15 mm to 60 mm.

Opaque hollow tubes 30, examples of which are shown in FIG. 8, may extend between the light sources 6a, 6b/lenses 16a, 16b and the reflectors 20, with the light outputs of the light sources 6a, 6b passing through the hollow tubes 30 along their axial directions. In FIG. 8, one of the opaque tubes 30, namely to one associated with the first light source 6a depicted in the front of FIG. 8, is not shown, in order to show the first lens 16a associated with the first light source 6a, which otherwise would be blocked from view by the opaque tube 30.

The opaque hollow tubes 30 may allow for preventing a deterioration of the light outputs of the aircraft passenger reading light 2, which may be caused by light, in particular stray light, from adjacent light sources 6a, 6b. Such stray light may be reflected by a reflector 20 that is not associated with the respective light sources 6a, 6b.

In a further embodiment, an individual reflective element 20a, 20b may be provided for each of the two light sources 6a, 6b of each pair 7 of light sources 6a, 6b, respectively.

Figure 11:
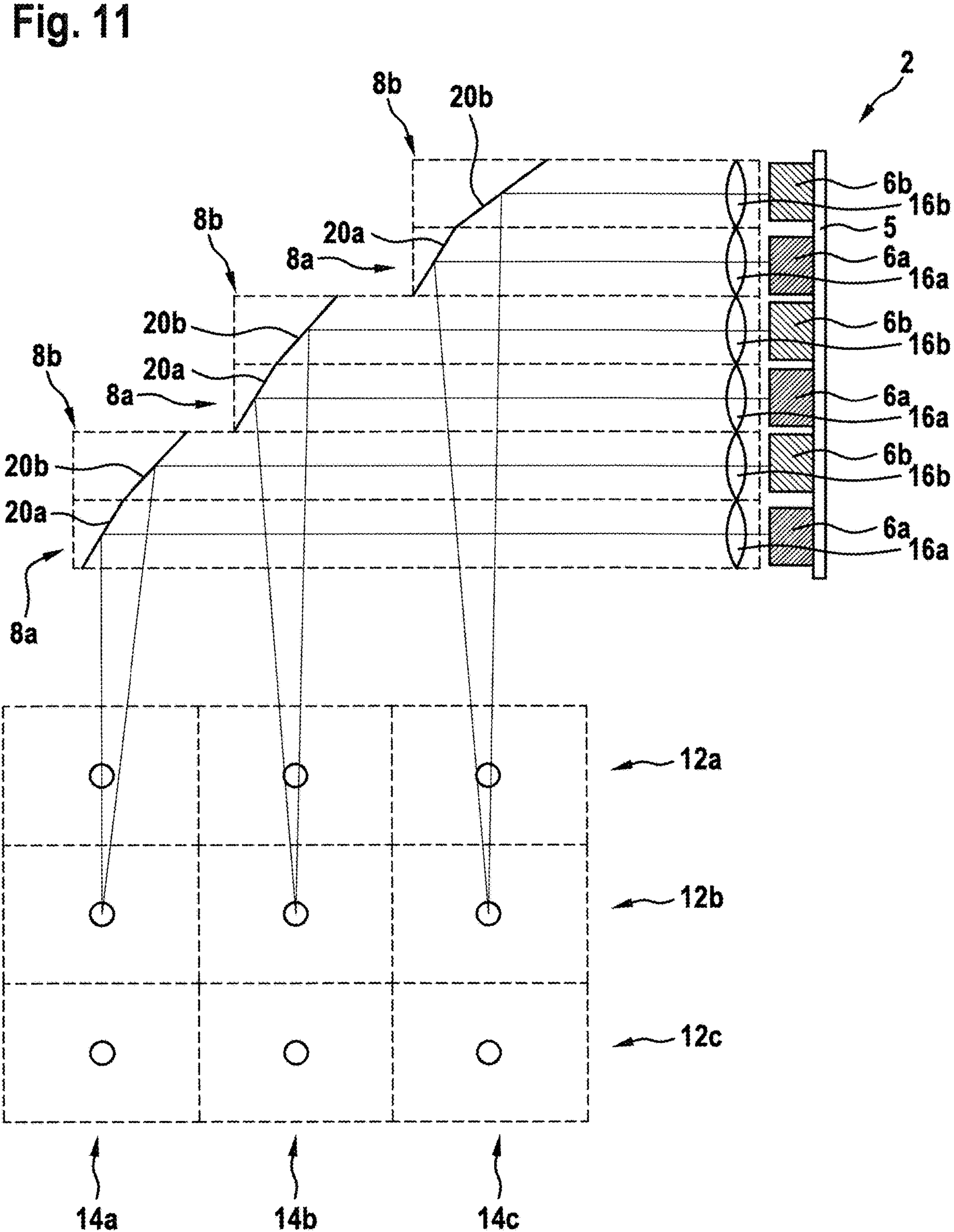
FIG. 11 shows a schematic vertical cross-sectional view of an aircraft passenger reading light according to another embodiment of the invention, the aircraft passenger reading light comprising a plurality of individual reflective elements.

A schematic cross-sectional view of an aircraft passenger reading light in accordance with an exemplary embodiment of the invention, comprising such individual reflective elements 20a, 20b, is schematically depicted in FIG. 11.

The features of the embodiment of an aircraft passenger reading light 2 depicted in FIG. 11, which correspond to the features depicted in FIGS. 7 to 9, are denoted with the same reference signs and will not be discussed in detail again. The above description of these features with reference to FIGS. 7 to 9 analogously applies to the embodiment depicted in FIG. 11.

In the exemplary embodiment depicted in FIG. 11, two reflective elements 20a, 20b, which are arranged at slightly different angles with respect to the circuit board 5 supporting the light sources 6a, 6b, are provided for each pair 7 of light sources 6a, 6b, respectively.

In other words, each of the optical system 8a, 8b comprises a lens 16a, 16b and a reflective element 20a, 20b, respectively, and the two reflective elements 20a, 20b of each pair of optical systems 8a, 8b are the same element. Further, the two reflective elements 20a, 20b of each pair of optical system 8a, 8b are not arranged along a common plane, i.e. a common straight line in the cross-sectional view of FIG. 11. Instead, they are inclined with respect to each other.

Providing an individual reflective element 20a, 20b for each of the two light sources 6a, 6b of every pair 7 of light sources 6a, 6b allows for aligning the first and second light outputs even more towards the respectively associated pair-specific reading zone 10. As a result, it may be possible to reduce the occurrence of undesirable color deviations at the periphery of the reading zones 10 even further.

In an aircraft passenger reading light 2 comprising individual reflective elements 20a, 20b for each of the light sources 6a, 6b, as it is depicted in FIG. 11, it may in particular be possible to reduce the spatial deviation of the first and second light outputs at the periphery of the reading zones 10 to less than 10 mm, resulting in a very pleasant color-mixed reading light output in each of the reading zones 10.

In the exemplary embodiment of an aircraft passenger reading light 2 depicted in FIG. 11, the two reflective elements 20a, 20b, which are associated with a single pair 7 of light sources 6a, 6b, may be formed integrally with each other, forming an integrated reflector 20. In such an integrated reflector 20, the difference in the spatial orientation between the two reflective elements 20a, 20b, which are provided by the two portions of the reflector 20, is set and fixed during the manufacturing process.

Depending on the geometric configuration of the aircraft passenger reading light 2, all reflectors 20, which are employed in the aircraft passenger reading light 2, may be identical with respect to their geometries. Alternatively, reflectors 20 having different geometries may be employed within a single aircraft passenger reading light 2.

All or at least some of the reflectors 20 may be formed integrally with each other, forming an integrated light reflecting structure. Providing such integrated light reflecting structure may simplify the manufacturing process of the aircraft passenger reading light 2.

In alternative embodiments, which are not explicitly shown in the figures, the reflective elements 20a, 20b, associated with each pair 7 of light sources 6a, 6b, may by formed separately from each other. Such separate reflective elements 20a, 20b may be adapted individually to different geometric configurations. They may, for example, be employed in different types of aircraft passenger reading lights 2 according to exemplary embodiments of the invention.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

What is claimed is:

1. An aircraft passenger reading light, comprising:

a plurality of pairs of light sources, wherein each of the plurality of pairs of light sources includes:

a first light source for emitting light having a first color, and a second light source for emitting light having a second color, wherein the second color differs from the first color; and wherein the aircraft passenger reading light comprises, for each of the plurality of pairs of light sources:

a first optical system for forming a first light output from the light emitted by the first light source; and a second optical system for forming a second light output from the light emitted by the second light source;

wherein the first light source, the second light source, the first optical system, and the second optical system are arranged and configured to direct the first light output and the second light output to a pair-specific reading zone, such that the first light output and the second light output at least partially overlap for providing a mixed-color reading light output in the pair-specific reading zone, wherein the plurality of pairs of light sources and the respective first optical system and the second optical system are arranged in an array arrangement, wherein the array arrangement includes at least two columns of pairs of light sources and at least three rows of pairs of light sources thereby forming at least six reading zones, and wherein the aircraft passenger reading light is a single light configured to provide light to a row of passenger seats including at least two seats.

2. The aircraft passenger reading light according to claim 1, wherein the first light source, the second light source, the first optical system, and the second optical system are arranged and configured such that, at a distance of 50 cm from the aircraft passenger reading light, the first light output and the second light output are offset from each other by less than 20 mm.

3. The aircraft passenger reading light according to claim 1, wherein each of the first and second optical systems includes a light transmissive optical element, wherein each of the first and second optical systems includes at least one of a lens or a prism; or wherein each of the first and second optical systems includes a light reflective optical element.

4. The aircraft passenger reading light according to claim 1, wherein at least one optical element of the first optical system and at least one optical element of the second optical system are formed integrally with each other, or wherein the first optical system and the second optical system are formed separately from each other.

5. The aircraft passenger reading light according to claim 1, wherein the plurality of pairs of light sources comprise at least one group of pairs of light sources, wherein respective pair-specific reading zones of the at least one group of pairs of light sources are laterally offset from each other, and wherein the respective pair-specific reading zones of the at least one group of pairs of light sources are associated with different passenger seats of a particular passenger seat row location.

6. The aircraft passenger reading light according to claim 5, wherein the plurality of pairs of light sources comprise multiple groups of pairs of light sources, wherein the respective pair-specific reading zones of different ones of the multiple groups of pairs of light sources are offset in a longitudinal direction of an aircraft in which the aircraft passenger reading light is installed from each other, and wherein the respective pair-specific reading zones of different ones of the multiple groups of pairs of light sources are associated with different longitudinal passenger seat row locations.

7. The aircraft passenger reading light according to claim 6, wherein the multiple groups of pairs of light sources and the respective first and second optical systems are arranged in adjacent building blocks along the array arrangement.

8. The aircraft passenger reading light according to claim 7, wherein the plurality of pairs of light sources and the respective first and second optical systems are arranged in a rectangular array arrangement, and wherein the multiple groups of pairs of light sources and the respective first and second optical systems are arranged in multiple rows of the array arrangement.

9. The aircraft passenger reading light according to claim 1, wherein, for each of the plurality of pairs of light sources, the first and second light outputs are angled with, substantially perpendicular to, a main light output direction of the first and second light sources.

10. The aircraft passenger reading light according to claim 1, wherein the first color is warm white, having a color temperature in a first range of between 2700 K and 3600 K and wherein the second color is cold white having a color temperature in a second range of between 4500 K and 6000 K; or wherein the first color is white, wherein the second color is a different color than white, and wherein the second color is at least one of amber or pink.

11. The aircraft passenger reading light according to claim 1, wherein the aircraft passenger reading light further comprises:

a first power supply connector, a second power supply connector and a third power supply connector for coupling the aircraft passenger reading light to an aircraft on-board power supply; and a multi-state switching arrangement having a plurality of switching states;

wherein each of the first light sources comprises a first electrical terminal and a second electrical terminal, respectively;

wherein the first electrical terminals of the plurality of first light sources are electrically coupled to the first power supply connector; and wherein the second electrical terminals of the plurality of first light sources are coupled via the multi-state switching arrangement to the second power supply connector;

wherein each of the second light sources comprises a first electrical terminal and a second electrical terminal, respectively;

wherein the first electrical terminals of the plurality of second light sources are electrically coupled to the third power supply connector; and wherein the second electrical terminals of the plurality of second light sources are coupled via the multi-state switching arrangement to the second power supply connector;

wherein each of the plurality of switching states couples the second electrical terminals of the first and second light sources of a single one of the plurality of groups of the plurality of pairs of light sources to the second power supply connector and de-couples the second electrical terminals of the first and second light sources of the other groups of the plurality of pairs of light sources from the second power supply connector.

12. The aircraft passenger reading light according to claim 1, comprising at least one dimmer for dimming the light intensity of the first light sources and/or for dimming the light intensity of the second light sources.

13. An aircraft, comprising a passenger cabin with a plurality of passenger seat rows and a plurality of aircraft passenger reading lights in accordance with claim 1, wherein the plurality of aircraft passenger reading lights are arranged above the plurality of passenger seat rows.

14. A method of operating an aircraft passenger reading light according to claim 1, wherein the method includes:

for at least a subset of the plurality of pairs of light sources, simultaneously operating the first light source and the second light source for generating mixed-color reading light outputs in the respective pair-specific reading zones.

15. A method according to claim 14, wherein the method includes:

for at least the subset of the plurality of pairs of light sources, setting a light intensity for at least one of the first light source and the second light source for controlling a color of the reading light output of the aircraft passenger reading light.

* * * * *